US006792541B1

(12) United States Patent
Kusakabe et al.

(10) Patent No.: US 6,792,541 B1
(45) Date of Patent: Sep. 14, 2004

(54) DATA STORAGE DEVICE USING CERTIFICATION KEYS AND METHOD TO PERFORM ACCESS CONTROL USING CERTIFICATION KEYS

(75) Inventors: Susumu Kusakabe, Kanagawa (JP); Masayuki Takada, Tokyo (JP); Masachika Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/353,714

(22) Filed: Jul. 14, 1999

(30) Foreign Application Priority Data

Jul. 16, 1998 (JP) .......................................... 10-201498

(51) Int. Cl.[7] ............................................... H04L 9/00
(52) U.S. Cl. .......................... 713/200; 707/9; 707/200; 380/277
(58) Field of Search ................................. 713/200, 201, 713/202, 193, 156–157; 380/281, 44, 45, 284, 280; 711/163, 164, 117; 707/1, 200, 9, 10; 235/375, 380, 382, 382.5

(56) References Cited

U.S. PATENT DOCUMENTS

| 5,408,082 | A | * | 4/1995 | Takagi et al. ................ 235/492 |
| 5,748,735 | A | * | 5/1998 | Ganesan ...................... 380/21 |
| 5,982,892 | A | * | 11/1999 | Hicks et al. .................... 380/4 |
| 6,075,858 | A | * | 6/2000 | Schwartzman .................. 380/4 |
| 6,263,435 | B1 | * | 7/2001 | Dondeti et al. ............. 713/163 |
| 6,289,455 | B1 | * | 9/2001 | Kocher et al. .............. 713/194 |
| 6,336,121 | B1 | * | 1/2002 | Lyson et al. ................ 707/201 |
| 6,345,360 | B1 | * | 2/2002 | Kamada et al. ............. 713/200 |
| 6,367,016 | B1 | * | 4/2002 | Lambert et al. ............ 713/185 |
| 6,385,723 | B1 | * | 5/2002 | Richards ..................... 713/160 |
| 6,487,646 | B1 | * | 11/2002 | Adams et al. .............. 711/163 |
| 6,578,039 | B1 | * | 6/2003 | Kawamura .................. 707/100 |

OTHER PUBLICATIONS

Fuller, Thomas: For Malaysia, Can One 'National Card' Do It All?; International Herald Tribune, Oct. 7, 1997. 3 pages.*
Menezes, Alfred J.: Handbook of Applied Cryptography; CRC Press LLC, 1997. p. 169–173, 544–558, and 588.*

* cited by examiner

*Primary Examiner*—Kim Vu
*Assistant Examiner*—Leynna Ha
(74) *Attorney, Agent, or Firm*—Frommer Lawrence & Haug LLP; William S. Frommer; Hans R. Mahr

(57) ABSTRACT

A code range which is the range of usable identification codes (corresponding to file names or directory names) is stored in an area defining area corresponding to a directory, and a layer structure in which the area defining area concerned is set as a parent layer and the other area defining areas are set as child layers is constructed on the basis of the code range. Further, the capacity (empty capacity) of the usable storage area is stored in the area defining area, and the capacity and identification codes which are usable in the layer of an area defining area are restricted by the empty capacity and the code range.

56 Claims, 25 Drawing Sheets

LOGICAL FORMAT OF EEPROM 66

DIRECTORY STRUCTURE

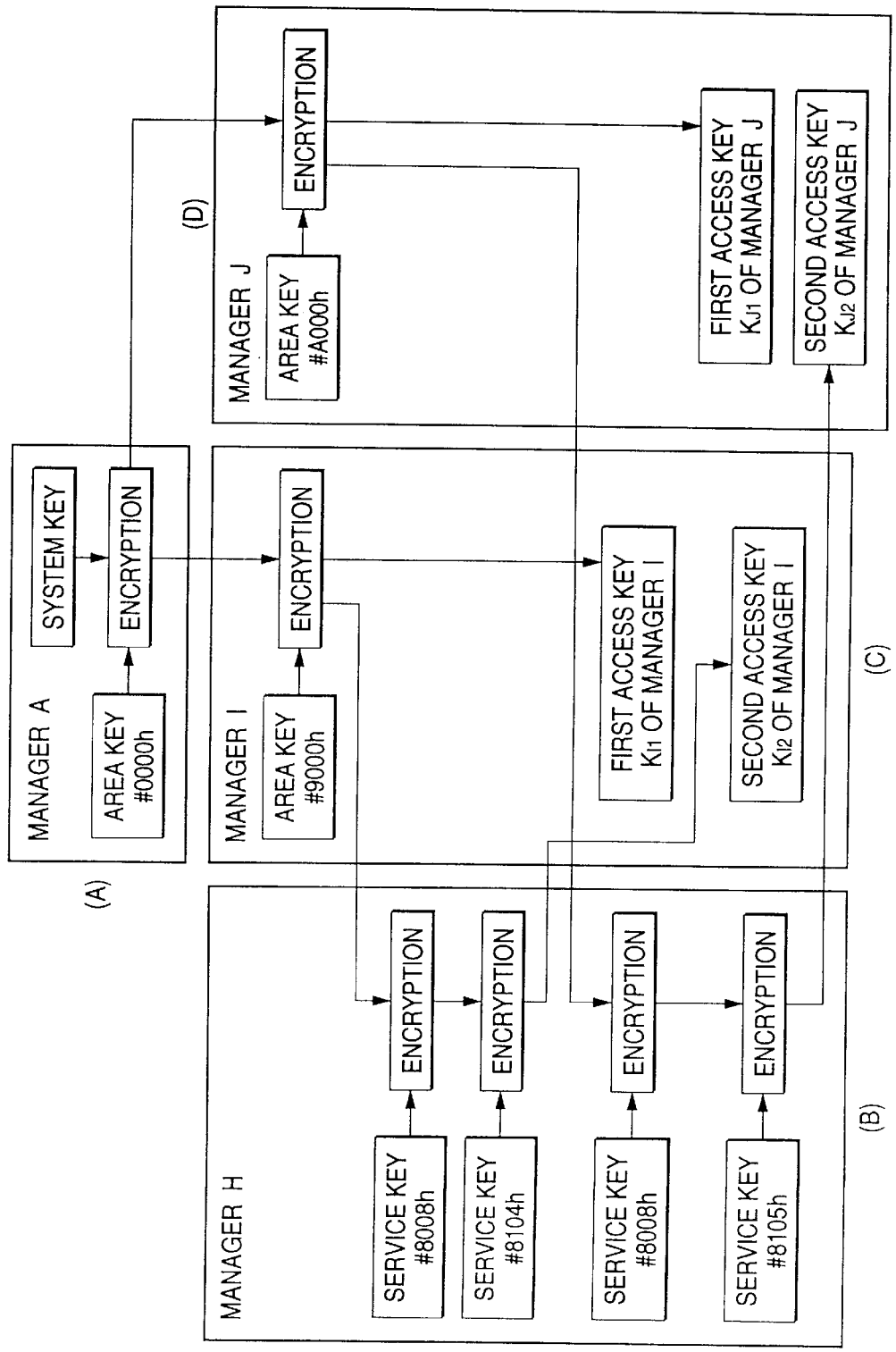

DATA STORAGE DEVICE USING CERTIFICATION KEYS AND METHOD TO PERFORM ACCESS CONTROL USING CERTIFICATION KEYS

BACKGROUND OF THE INVENTION

1. Field of the Invention

The present invention relates to a data storage device and a data storage method, and relates to a data storage device and a data storage method which can manage resources of IC cards and perform access control to IC cards with high flexibility and security in a case where a plurality of managers supply their services by using an IC (Integrated Circuit) card.

2. Description of the Related Art

For example, an IC card (smart card) which is expected to be used in an electronic money system, a security system, etc. has been developed.

The IC card has a CPU (Central Processing Unit) for performing various kinds of processing and a memory for storing data necessary for the processing, and data transmission/reception to/from the IC card is performed while it is electrically connected to a predetermined reader/writer (R/W) or under a non-contact state by using electromagnetic wave. An IC card which performs data transmission/reception with R/W under non-contact state by using electromagnetic wave is generally supplied with necessary power through electromagnetic wave.

For example, in ISO (International Organization for Standardization) 7816, the standard of contact type IC cards is defined. According to this standard, the data management can be performed on the basis of, for example, EF (Elementary File) (corresponding to a so-called file) for storing data and DF for storing EF and DF (Dedicated File) (corresponding to a so-called directory (folder)). Accordingly, the data management based on the layer structure is possible by setting some DF as a parent layer and providing DF of a child layer thereof.

When IC cards are used for the service supply by plural managers, there may be considered a method of allocating DF as a layer to each of the plural managers and storing EF as data to be supplied for the service supply of each manager in the DF.

However, it is difficult in ISO7816, etc. to restrict the usable capacity and the resources of the IC card such as identification codes for identifying DF and EF (corresponding to a file name and a directory name) for every DF.

Therefore, it is difficult to prevent an identification code from being duplicated between different managers, and also it is difficult to restrict a manager from using a memory contained in an IC card by a capacity exceeding a predetermined capacity which is determined through a contract or the like.

Further, in a case where IC cards are used in an electronic money system or security system, securities such as secrecy of data, prevention of forgery of IC cards, etc. are important, and for example, ISO7816, an access to DF and EF belonging to DF is restricted by locking DF. That is, in ISO7816, in order to access some DF, it is necessary to know all the DF keys of upper layers (parent layers) on the bus extending to the DF concerned.

Therefore, for example, when some manager serving as a parent manager shares a part of resources allocated thereto to another manager serving as a child manager and DF managed by the child manager is formed in DF managed by the parent manager, in order for the child manager to access the DF thereof, the child manager is required to know a key to access the DF of the parent layer, that is, the DF of the parent manager, and there occurs a problem in security.

SUMMARY OF THE INVENTION

The present invention has been implemented in view of such a situation, and has an object to enable a resource management to store data and access control having high flexibility and security to data.

According to an aspect of the present invention, a data storage device is characterized by comprising: storage means having an area defining area for storing the range of a storage area identifying code which can be allocated to a storage area to be managed and is used to identify the storage area and the empty capacity of the storage area to be managed; and management means for managing the storage means on the basis of the storage content of the area defining area. The storage means has the area defining area for storing the range of the storage area identification code which can be allocated to the storage area to be managed and is used to identify the storage area, and the empty capacity of the storage area to be managed, and the management means manages the storage means on the basis of the storage content of the area defining area.

According to another aspect of the present invention, a data storage method is characterized by comprising a management step of managing storage means on the basis of the storage content of an area defining area of the storage means having an area defining area for storing the range of a storage area identifying code which can be allocated to a storage area to be managed and is used to identify the storage area and the empty capacity of the storage area to be managed. The storage means is managed on the basis of the storage content of the area defining area of the storage means having the area defining area for storing the range of the storage area identifying code which can be allocated to the storage area to be managed and is used to identify the storage area and the empty capacity of the storage area to be managed.

According to a further aspect of the present invention, a data storage device is characterized by comprising: management means for managing the storage area of data storage means while setting the storage area in a layer structure; layer key storage means for storing a layer key for each layer of the storage area of the data storage means; data storage area key storage means for storing a data storage area key to a storage area in which data are stored; generation means for generating one or more certification key used for the certification to access the storage area by using two or more layer keys or data storage area keys; and certifying means for performing certification on the basis of the certification key. The management means manages the storage area of the data storage means while setting the storage area in the layer structure, and the layer key storage means stores the layer key for each layer key of the storage area of the data storage means. The data storage area key storage means stores the data storage area key for the storage area in which the data are stored, and the generating means generates one or more certification keys used for the certification to access the storage area by using two or more layer keys or data storage keys. The certifying means performs the certification on the basis of the certification key.

According to a still further aspect of the present invention, a data storage method is characterized by comprising a generation step of generating one or more certification keys used for the certification to access the storage area by using two or more layer keys or data storage area keys; and a certification step of performing the certification on the basis of the certification key. The one or more certification keys used for the certification to access the storage area are generated by two or more layer keys or data storage area keys, and the certification is carried out on the basis of the certification key.

BRIEF DESCRIPTION OF THE DRAWINGS

FIG. 25 is a diagram showing key reception/delivery between managers;

DETAILED DESCRIPTION OF THE PREFERRED EMBODIMENTS

Preferred embodiments according to the present invention will be described hereunder with reference to the accompanying drawings.

Figure 1:
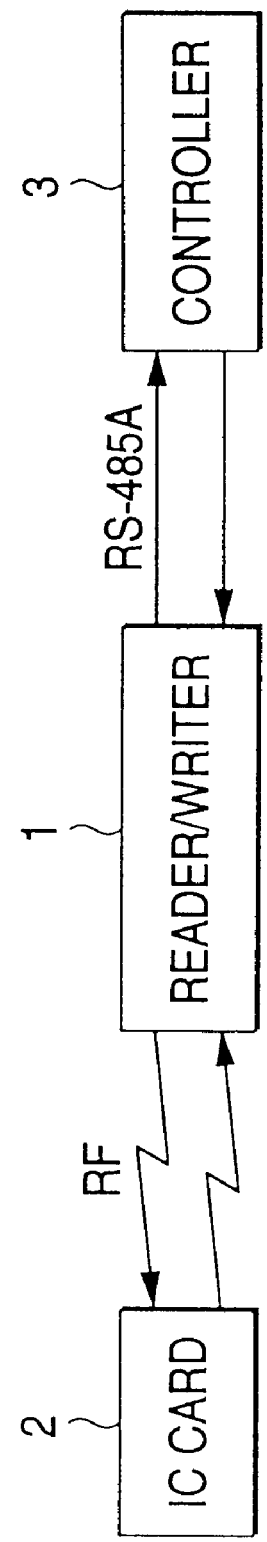
FIG. 1 is a block diagram showing the construction of an embodiment of a card system using an IC card to which the present invention is applied.

FIG. 1 shows the construction of an embodiment of a non-contact card system to which the present invention is applied (the system means a logical assembly of plural devices, and it is not dependent on whether the respective devices are located in the same housing or not).

The non-contact card system comprises R/W 1, an IC card 2 and a controller 3, and data transmission/reception is carried out between the R/W 1 and the IC card 2 under non-contact state by using electromagnetic wave.

That is, R/W 1 transmits a predetermined command to the IC card 2, and the IC card 2 receives the command to perform the processing corresponding to the command. The IC card 2 transmits the response data corresponding to the processing result to R/W 1.

R/W 1 is connected to the controller 3 through a predetermined interface (which is conformed with the standard of RS-485A or the like), and the controller 3 supplies a predetermined control signal to R/W 1 so that R/W 1 performs predetermined processing.

Figure 2:
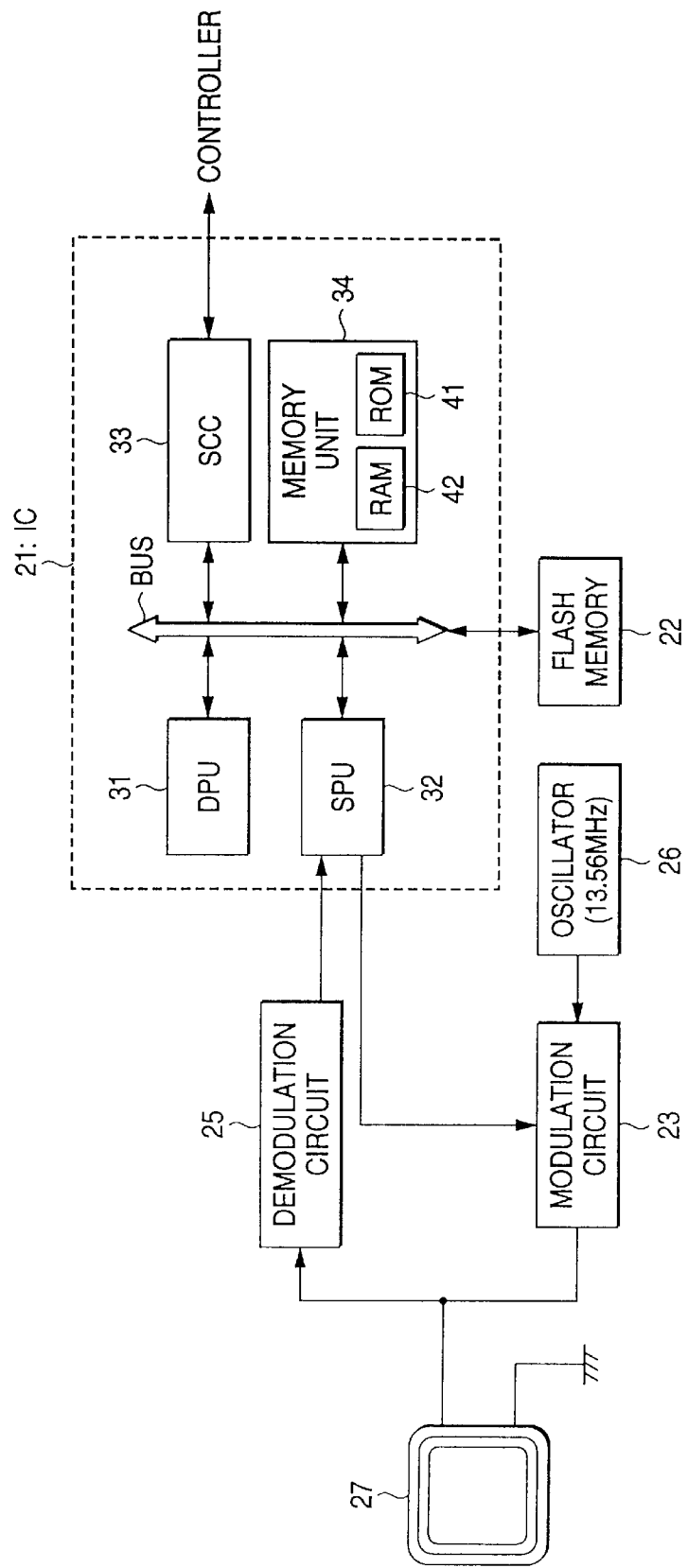
FIG. 2 is a block diagram showing the construction of a reader/writer 1 of FIG. 1.

FIG. 2 shows the construction of R/W 1 of FIG. 1.

In IC 21, DPU (Data Processing Unit) 31 for performing data processing, SPU (Signal Processing Unit) 32 for processing data to be transmitted to the IC card 2 and data received from the IC card 2, SCC (Serial communication Controller) 33 which communicates with the controller 3, and a memory unit 34 comprising a ROM portion 41 for beforehand storing information required to process data and a RAM portion 42 for temporarily storing data during processing are connected to one another through a bus.

Further, a flash memory 22 for storing predetermined data is also connected to the bus.

DPU 31 outputs to SPU 32 a command to be transmitted to the IC card 2, and receives from SPU 32 response data received from the IC card 2.

After predetermined processing (for example, BPSK (BiPhase Shift Keying) modulation (coding to Manchester code) or the like) is carried out on the command to be transmitted to the IC card 2, SPU 32 outputs it to a modulation circuit 23, and also it receives from a demodulation circuit 25 the response data transmitted by the IC card 2 and to perform predetermined processing on the data.

The modulation circuit 23 performs ASK (Amplitude Shift Keying) modulation on carrier wave having a predetermined frequency (for example, 13.56 MHz) supplied from an oscillator (OSC) 26 on the basis of data supplied from SPU 32, and outputs the modulation wave thus generated as electromagnetic wave through an antenna 27 to the IC card 2. At this time, the modulation circuit 23 is designed so that the modulation factor is set to be less than 1 and the ASK modulation is performed, whereby the maximum amplitude of the modulation wave is prevented from being reduced to zero even at low level of the data.

The demodulation circuit 25 demodulates the modulation wave (ASK-modulated wave) received through the antenna 27, and outputs the data thus demodulated to SPU 32.

Figure 3:
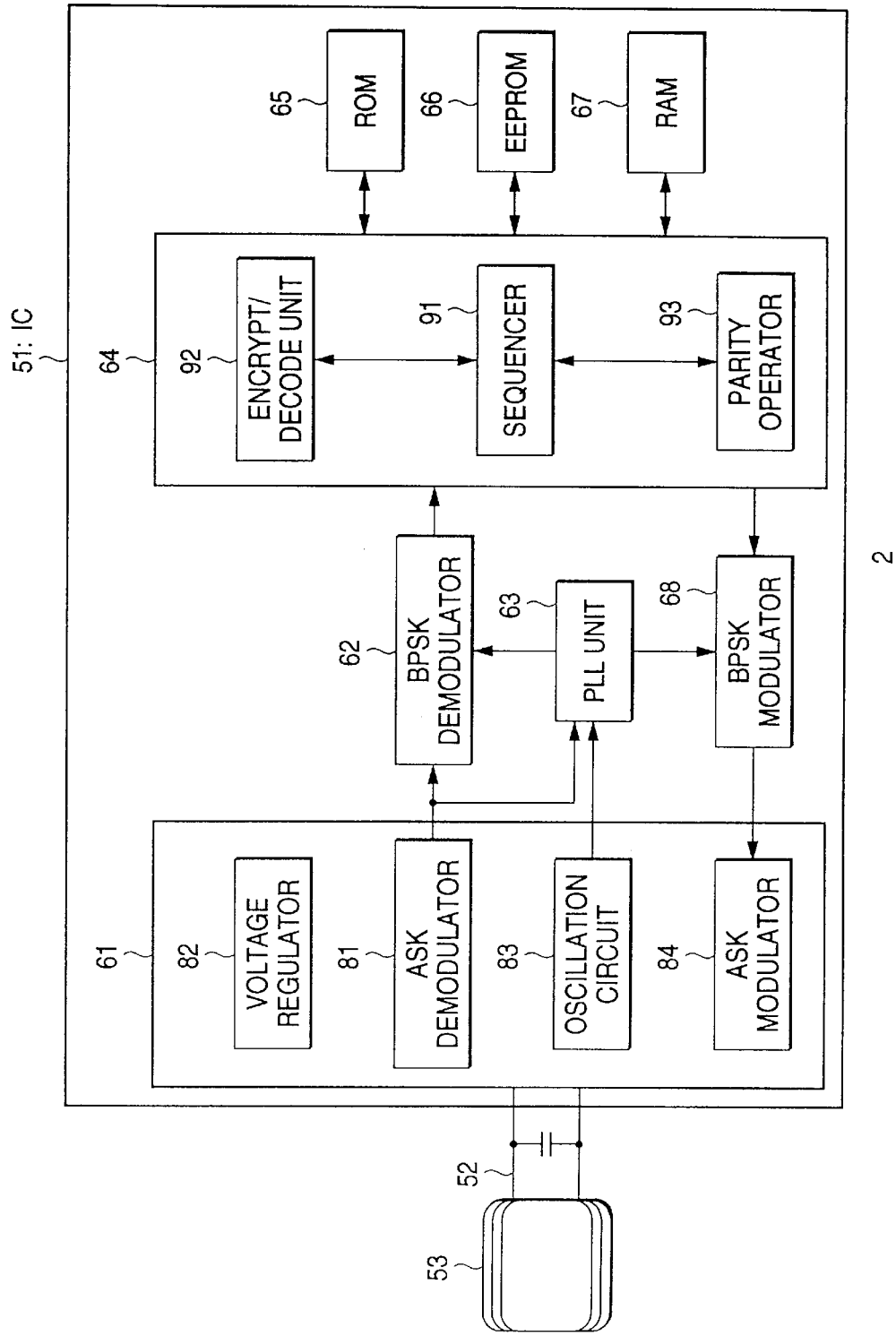
FIG. 3 is a block diagram showing the construction of the IC card 2 of FIG. 1.

FIG. 3 shows the construction of the IC card 2 of FIG. 1.

In the IC card 2, IC 51 receives the modulation wave transmitted from R/W 1 through the antenna 53. A capacitor 52 constitutes an LC circuit together with the antenna 53, and it is designed so as to be tuned (oscillated) with electromagnetic wave having a predetermined frequency (carrier frequency).

In IC 51, an RF interface unit 61 (communication means) detects and demodulates the modulation wave (ASK-modulated wave) received through the antenna 53 by an ASK demodulator 81, and outputs the data thus demodulated to a BPSK demodulation circuit 62 and a PLL (Phase Locked Loop) unit 63. In addition, it stabilizes the signal detected in an ASK demodulator 81 by a voltage regulator 82, and supplies it as a DC power to each circuit.

The RF interface unit 61 oscillates a signal having the same frequency as the clock frequency of the data in an oscillation circuit 83, and outputs the signal to the PLL unit 63.

In the RF interface unit 61, the load of the antenna 53 serving as the power source of the IC card 2 is varied in connection with data supplied through the BPSK modulation circuit 68 from the operation unit 64 in the ASK modulator 81 (for example, a prescribed switching element is switched on/off in connection with data and only when the switching element is switched on, a predetermined load is connected to the antenna 53 in parallel), whereby the modulation wave received through the antenna 53 is subjected to ASK modulation (when the data are transmitted from the IC card 2 (the IC card 2 is made to transmit data), R/W 1 sets the maximum amplitude of the modulation wave output therefrom to a fixed value, and this modulation wave is subjected to the ASK modulation on the basis of the variation of the load of the antenna 53), and transmits the modulation component thereof through the antenna 53 to R/W 1 (varies the terminal voltage of the antenna 27 of R/W 1).

On the basis of the data supplied from the ASK demodulator 81, the PLL unit 63 generates a clock signal which is in synchronism with the data, and outputs the clock signal to the BPSK demodulation circuit 62 and the BPSK modulation circuit 68.

When the data demodulated in the ASK demodulator 81 are BPSK-modulated, the BPSK demodulation circuit 62 demodulates the data (decodes Manchester code) according to the clock signal supplied from the PLL unit 63 and outputs the data thus demodulated to the operation unit 64.

When the data supplied from the BPSK demodulation circuit 62 are encrypted, the operation unit 64 decodes the data in an encrypt/decode unit 92, and then processes the data in a sequencer 91. When the data are not encrypted, the data supplied from the BPSK demodulation circuit 62 are directly to the sequencer 91, not passing through the encrypt/decode unit 92.

The sequencer 91 (management means) (generating means) (certifying means) is designed to perform the processing corresponding to data as a command to be supplied thereto. That is, for example, the sequencer 91 performs data writing and reading operation into/from EEPROM 6 and other necessary operation processing. Further, the sequencer 91 performs an access control to EEPROM 66 on the basis of certification and also manage EEPROM 66.

A parity operator 93 of the operation unit 64 calculates a Reed Solomon code as a parity on the basis of the data stored in EEPROM 66.

After the operation unit 64 performs predetermined processing in the sequencer 91, it outputs the response data corresponding to the processing (the data to be transmitted to R/W 1) to the BPSK modulation circuit 68.

The BPSK modulation circuit 68 subjects the data supplied from the operation unit 64 to BPSK modulation, and outputs the data thus modulated to the ASK modulator of the RF interface unit 61.

ROM (Read Only Memory) 65 stores a program with which the sequencer 91 performs its processing, and other necessary data. RAM 67 temporarily stores data in the course of the processing of the sequencer 91 and the like.

EEPROM (Electrically Erasable and Programmable ROM) 66 (storage means) (data storage means) is a nonvolatile memory, and it continues to store data even when the IC card finishes the communication with R/W 1 and power supply is stopped.

Next, the data transmission/reception processing between R/W 1 and the IC card 2 will be described.

R/W 1 (FIG. 2) radiates predetermined electromagnetic wave from the antenna 27, monitors the load state of the antenna 27 and waits until the variation of the load state due to approach of the IC card 2 is detected. R/W 1 may perform processing (polling) in which the electromagnetic wave which is ASK-modulated on the basis of data of a predetermined short pattern is radiated to call to the IC card 2 until a response is obtained from the IC card 2 within a fixed time.

When the approach of the IC card 2 is detected in R/W 1, SPU 32 of R/W 1 subjects rectangular wave of a predetermined frequency (for example, a frequency which is twice as high as the clock frequency of the data) as carrier wave, performs it to BPSK modulation on the basis of data to be transmitted to the IC card 2 (the command corresponding to processing to be executed by the IC card 2, write-in data to be written into the IC card 2, etc.), and outputs the modulation wave (BPSK modulation signal) thus generated (Manchester code) to the modulation circuit 23.

In the BPSK modulation processing, the data can be associated with the variation of the phase of the modulation wave by using differential conversion, and in this case, the BPSK modulation signal can be demodulated to the original data even when it is inverted. Therefore, it is unnecessary to consider the polarity of the modulation wave in the demodulation operation.

On the basis of the BPSK modulation signal input, the modulation circuit 23 subjects predetermined carrier wave to the ASK modulation at a modulation factor (=maximum amplitude of data signal/maximum amplitude of carrier wave) which is less than 1 (for example, 0.1), and transmits the modulation wave (ASK modulation wave) thus generated through the antenna 27 to the IC card 2.

When no transmission is carried out, the modulation circuit 23 generates the modulation wave, for example, at high level of two levels (high level and low level) of digital signals.

In the IC card 2 (FIG. 3), a part of electromagnetic wave radiated from the antenna 27 of R/W 1 is converted to an electrical signal in an LC circuit comprising an antenna 53 and a capacitor 52, and the electrical signal (modulation wave) is output to the RF interface 61 of IC 51. The ASK demodulator 81 of the RF interface 61 detects an envelope by rectifying and smoothening the modulation wave and supplies the signal thus generated to the voltage regulator 82. In addition, it suppresses the DC component of the signal to extract the data signal, and outputs the data signal to the BPSK demodulation circuit 62 and the PLL unit 63.

At this time, the terminal voltage $V_0$ of the antenna 53 is as follows.

$$V_0 = V_{10}(1 + k \times Vs(t)) \cos(\omega t)$$

However, $V_{10} \cos(\omega t)$ represents carrier wave, k represents the modulation factor and $Vs(t)$ represents data output from SPU 32.

The value $V_{LR}$ of low level in the voltage $V_1$ after the rectification by the ASK demodulator 81 is as follows.

$$V_{LR} = V_{10}(1 + k \times (-1)) - Vf$$

Here, in the ASK demodulator 81, Vf represents a voltage drop in a diode (not shown) constituting a rectifying circuit for rectification and smoothening, and it is generally equal to about 0.7 volt.

When receiving the signal rectified and smoothened by the ASK demodulator 81, the voltage regulator 82 stabilizes the signal and supplies it as DC power to respective circuits as well as the operation unit 64. In this case, since the modulation factor k of the modulation wave is less than 1 as described above, the voltage variation (the difference between the high level and the low level) after the rectification is small. Accordingly, the DC power can be easily generated in the voltage regulator 82.

Here, when the modulation wave having the modulation factor k of 5% is received so that $V_{10}$ is above 3 volts, the low level voltage $V_{LR}$ after the rectification is equal to 2.15 (=3×(1−0.05)−0.7) volts or more, and the voltage regulator 82 can supply a sufficient voltage as power to each circuit. In this case, the amplitude $2 \times k \times V_{10}$ (Peak-to-Peak value) of the AC component (data component) of the voltage $V_1$ after the rectification is equal to 0.3 (=2×0.05×3) volts or more, and the ASK demodulator 81 can demodulate the data at a sufficiently high S/N ratio.

As described above, by using the ASK modulation wave having a modulation factor k less than 1, a communication having a low error rate (in a high S/N ratio state) can be performed, and a DC voltage which is sufficient as power can be supplied to the IC card 2.

When receiving the data signal (BPSK demodulation signal) from the ASK demodulator 81, the BPSK demodulation circuit 62 demodulates the data signal according to the clock signal supplied from the PLL unit 63 and outputs the data thus demodulated to the operation unit 64.

When the data supplied from the BPSK demodulation circuit 62 is encrypted, the operation unit 64 decodes the data in the encrypt/decode unit 92, and then supplies the data (command) to the sequencer 91 to process the data. During this time period, that is, during the period from the time when the data are transmitted to the IC card 2 until a response to the transmission is received, R/W 1 transmits data having a value of 1 and is on standby. Accordingly, during this time, the IC card 2 receives the modulation wave whose maximum amplitude is constant.

After the processing is finished, the sequencer 91 outputs the data on the processing result, etc. (data to be transmitted to R/W 1) to the BPSK modulation circuit 68. The BPSK modulation circuit 68 subjects the data to the BPSK modulation (coding to Manchester code) as in the case of SPU 32 of R/W 1, and then outputs the modulated data to the ASK modulator 84 of the RF interface unit 61.

The ASK modulator 84 varies a load connected to both the ends of the antenna 53 in accordance with data from the BPSK modulation circuit 68 by using a switching element or the like, whereby the modulation wave received (the maximum amplitude of the modulation wave output from R/W 1 is constant at the transmission time of data from the IC card 2 as described above) is subjected to ASK modulation in accordance with the data to be transmitted to vary the terminal voltage of the antenna 27 of R/W1, and then transmits the data thus modulated to R/W 1.

The modulation circuit 23 of R/W 1 continues the transmission of data having value of 1 (high level) at the reception time of the data from the IC card 2. In the demodulation circuit 25, the data transmitted from the IC card 2 is detected on the basis of minute variation (for example, several tens micro volts) of the terminal voltage of the antenna 27 which is electromagnetically coupled to the antenna 53 of the IC card 2.

Further, in the demodulation circuit 25, the detected signal (ASK modulation wave) is amplified and modulated by a high-gain amplifier (not shown), and digital data thus obtained are output to SPU 32. SPU 32 demodulates the data (BPSK modulation signal) and outputs it to DPU 31. DPU 31 processes data from SPU 32 and judges on the basis of the processing result whether the communication should be finished or not. If it judges that the communication is carried out again, the communication between R/W 1 and the IC card 2 is carried out like the above case. On the other hand, if it judges that the communication is finished, R/W 1 finishes the communication processing with the IC card 2.

As described above, R/W 1 transmits data to the IC card 2 by using the ASK modulation in which the modulation factor k is less than 1, and the IC card 2 receives the data to carry out the processing corresponding to the data and returns the data corresponding to the processing result to R/W 1.

Figure 4:
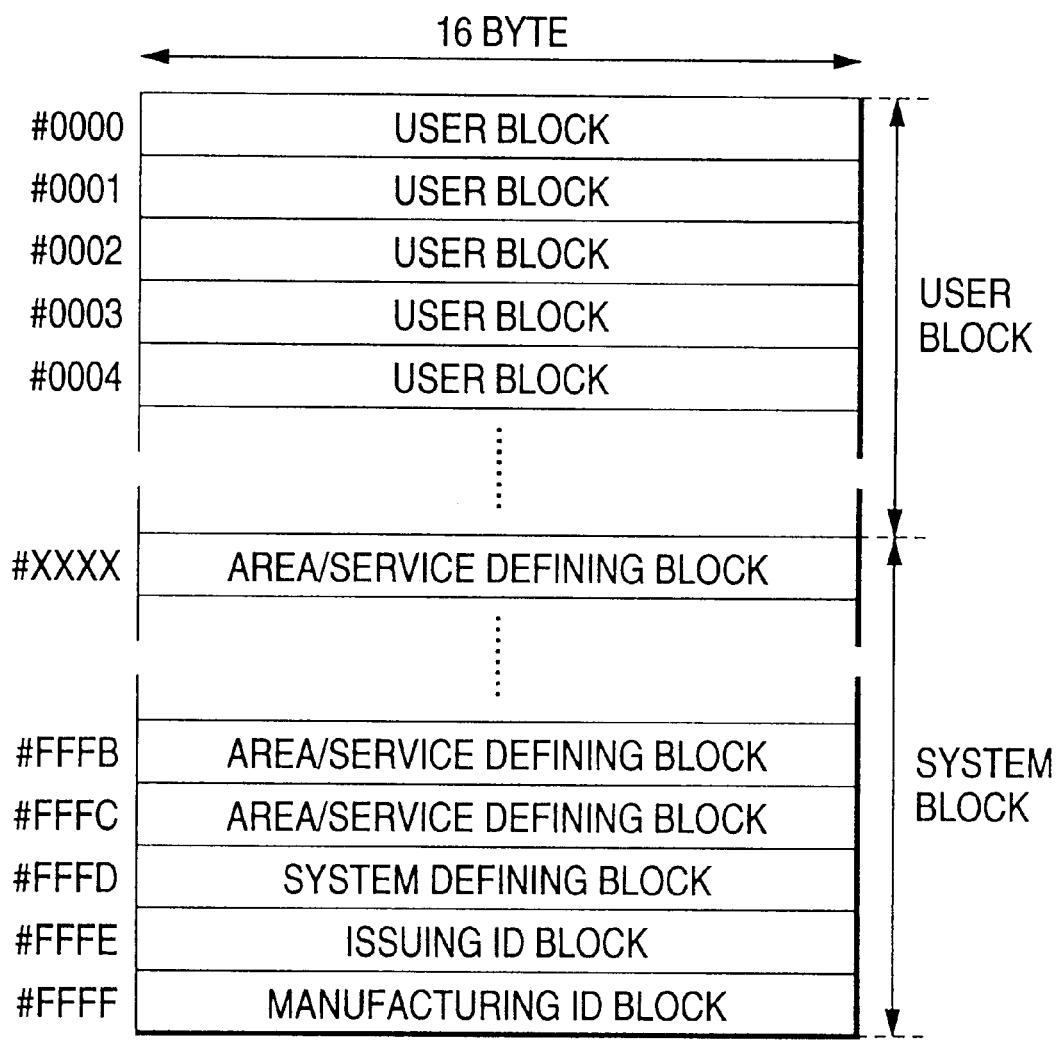
FIG. 4 is a diagram showing a logical format of EEPROM 66 of FIG. 3.

FIG. 4 shows a logical format of EEPROM 66 of FIG. 3.

EEPROM 66 is constructed on a block basis, and in an embodiment of FIG. 4, one block is composed of 16 bytes, for example.

Further, in the embodiment of FIG. 4, the logical address of the uppermost block is set to #0000h (h represents a hexadecimal number), and other logical addresses are allocated in ascending numeric order. In FIG. 4, #0000h to #FFFFh are allocated as the logical addresses, and thus blocks of 65536 (=$2^{16}$) are constructed.

The blocks are constructed as so to be used as a user block or system block. The blocks of EEPROM 66 are allocated to the user blocks in the ascending numeric order of the logical addresses, and allocated to the system blocks in the descending numeric order of the logical addresses. That is, in FIG. 4, the user blocks are increased downwardly and the system blocks are increased upwardly. At the time when there is no empty block, the user block and the system block cannot be formed. Accordingly, the boundary between the user blocks and the system blocks is not fixed, and no restriction is imposed on the number of the user blocks and the number of the system blocks (however, in the embodiment of FIG. 4, the total number of the user blocks and the system blocks is limited to 65536 or less).

The system block are classified into five kinds of blocks: a manufacturing ID (Identification) block, an issuance ID block, a system defining block, an area defining block and a service defining block. In the embodiment of FIG. 4, the block serving as the area defining block or service defining block is shown as an area/service defining block.

Out of the system blocks, the three kinds of blocks of the manufacturing ID block, the issuance ID block and the system defining block have been basically disposed at the issuance time of the IC card 2, and they are disposed at logical addresses #FFFFh, #FFFEh and #FFFDh, respectively. The area/service defining blocks are disposed in forming order at logical addresses higher than the logical address #FFFCh.

Information on the manufacturing of the IC card 2 is disposed in the manufacturing ID block. That is, for example, a unique manufacturing ID, a manufacturing date, a manufacture code, etc. are disposed in the manufacturing ID block.

Information on issuance of the IC card 2 is disposed in the issuance ID block. That is, in the issuance ID block are disposed codes of an issuance date of the IC card 2, an issuance order of the IC card 2, etc.

In the system defining block are disposed the number of system blocks or user blocks owned by EEPROM 66, a system key and the like. The system key is used when mutual certification is carried out among the IC card 2, R/W 1 and the controller 3.

The area defining block is formed by allocating a storage area (area) of EEPROM 66 to the manager, and information to manage the storage area allocated to the manager itself, etc. are disposed in the area defining block. That is, in the area defining block are disposed a code range described later, an empty capacity, an area key, etc., for example.

In the service defining block are disposed information to manage a service area described later (the capacity of a service area, a service key, etc.), etc.

The storage area of EEPROM 66 is managed in the sequencer 91 with being layered.

Figure 5:
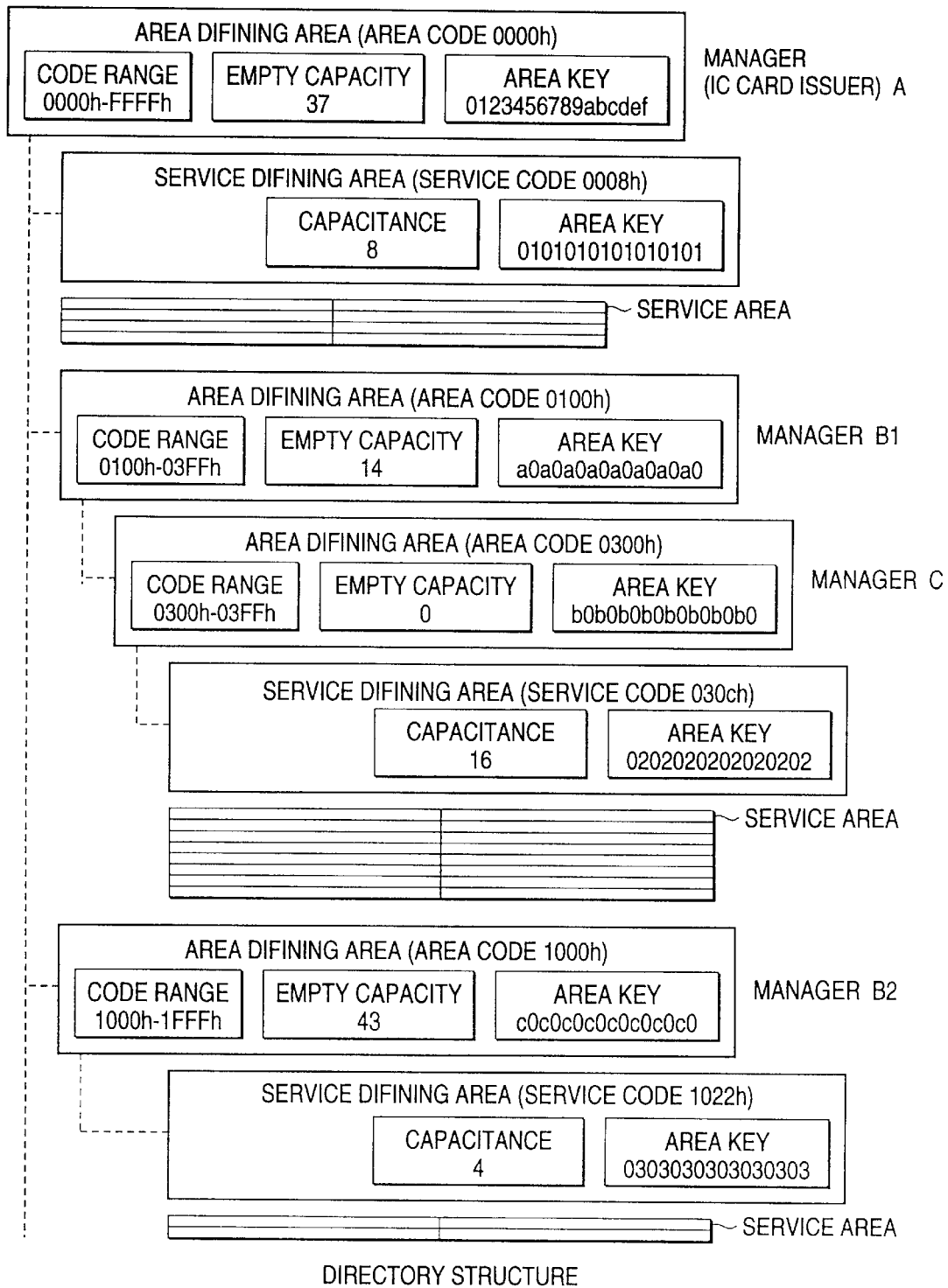
FIG. 5 is a diagram showing the directory structure of EEPROM 66 of FIG. 3.

Next, FIG. 5 shows the directory structure of EEPROM 66.

The storage area of EEPROM 66 is designed in a layered structure in which the area defining area is layered, and the area defining area is designed so as to be able to have an area defining area and a service defining area.

The area defining area (layer key storage means) is allocated to the manager. In the area defining area are disposed a code range representing a range of identification codes which are usable as names for identification of the area defining area and the service defining area by the manager, an empty capacity representing the number of empty blocks available, an area key to generate an access key described later which is used for certification. Here, the area defining area of 1 corresponds to the area defining block of 1 described with respect to FIG. 4.

In the embodiment of FIG. 5, the area defining area allocated to the manager A constitutes the uppermost layer, and the area defining areas of the managers B1 and B2 are formed with the defining area of the manager A being set as a parent layer. Further, the area defining area of the manager C is formed with the defining area of the manager B1 being set as a parent layer.

The service defining area (data storage area key storing means) is allocated to a service supplied from the manager, and the capacity of a service area for storing data necessary to supply services, a service key to generate an access key, etc. are disposed in the service defining area. Here, the service defining area of 1 corresponds to the service defining block of 1 described with reference to FIG. 4.

The service area is a storage areas for storing data necessary to supply services, and it corresponds to the user block of FIG. 4. That is, the service area is constructed by user blocks above 0, and the number of user blocks constituting the service area is disposed as the capacity of the service defining area for managing the service area.

Further, in the area defining area and the service defining area are disposed identification codes for identifying these areas. Here, the identification codes to identify the area defining area and the service defining area are hereinafter referred to as an area code and a service code. The service code is to identify the service defining area for managing a service area, and thus it can be regarded as an identification code (service area identification code) for identifying the service area concerned.

In the embodiment of FIG. 5, the area defining area of the uppermost layer is allocated to the manager A. 0000h to FFFFh are defined as a range of usable identification codes (code range), and 0123456789abcdef are defined as an area key. Here, any identification code may be used as the area code of the area defining area if it is an identification code within the code range in the area defining area. In this embodiment, the minimum value of the code range of the area defining area is used as the area code thereof. Accordingly, the area code of the area defining area whose code range is from 0000h to FFFFh, that is, the area defining areas allocated to the manager A is set to 0000h. Here, the area defining area whose area code is set to #xxxxh is hereinafter described as the area defining area #xxxxh.

The layer of the area defining area #0000h of the manager A is provided with a service defining area in which the manager A supplies services. 0008h of the code range from 0000h to FFFFh of the area defining area #0000h is allocated as a service code to the service defining area. Here, the service defining area of the service code #xxxxh is hereinafter described as the service defining area #xxxxh.

The capacity of the service defining area #0008h is set to 8, and thus the service area constructed by user blocks of 8 is usable. Further, the service key of the service defining area #0008h is set to 0101010101010101.

The layer of the area defining area #0000h of the manager A is provided with an area defining area #0100h of the manager B1 and an area defining area #1000h of the manager B2 as child layers. Further, the layer of the area defining area #0000h is provided with other area defining areas (not shown), and thus the number of blocks (empty capacity) usable by the area defining area #0000h is set to 37 blocks, for example.

As the code range of the area defining area #0100h of the manager B1 is allocated 0100h to 03FFh in the code range from 0000h to FFFFh of the area defining area #0000h which is the parent layer of the area defining area #0100h. Here, since the code range of the area defining area of the manager B1 is from 0100h to 03FFh, 0100h which is the minimum value of the code range is set as the area code of the area defining area of the manager B1.

Further, the empty capacity and the area key of the area defining area #0100h are set to 14 and a0a0a0a0a0a0a0a0, respectively.

Further, the layer of the area defining area #0100h of the manager B1 is provided with the area defining area #0300h of the manager C as a child layer thereof. As the code range of the area defining area #0300h of the manager C is allocated 0300h to 03FFh in the code range from 0100h to 03FFh of the area defining area #0100h which is the parent layer thereof. Here, since the code range of the area defining area of the manager c is from 0300h to 03FFh, 0300h which is the minimum of the code range is set as the area code of the area defining area of the manager C.

The empty capacity and area key of the area defining area #0300h are set to 0 and b0b0b0b0b0b0b0b0, respectively.

The layer of the area defining area #0300h of the manager c is provided with a service defining area for service supply by the manager C. 030Ch in the code range from 0300h to 03FFh of the area defining area #0300h is allocated as a service code to the service defining area.

The capacity of the service defining area to which the service code 030Ch is allocated, that is, the service defining area #030Ch is set to 16, and thus the service area constructed by user blocks of 16 can be used. Further, the service key of the service defining area #030Ch is set to 0202020202020202.

Here, the capacity of the service area managed by the service defining area #030Ch is equal to 16, and the service defining area #030Ch itself uses one block as a service defining block, so that the number of blocks being used is equal to 17 (=16+1) because the service defining area #030Ch exists. The number of blocks usable by the area defining area #0300h of a layer to which the service defining area #030Ch belongs is equal to zero block because the empty capacity thereof is equal to zero. Further, the area defining area #0300h itself uses one block as an area defining block. Accordingly, in the layer of the area defining area #0300h, the number of blocks being used is equal to 18 (=17+1) and the number of usable blocks is equal to zero. Therefore, it is found that the number of blocks allocated from the area defining area #0100h serving as its parent layer (upper layer) is equal to 18 (=18+0).

With respect to the layer of the area defining area #0100h, 18 blocks are used in the area defining area #0300h serving as a child layer (lower layer) of the area defining area #0100h as described above. Further, the area defining area #0100h itself uses one block as an area defining block. The empty capacity of the area defining area #0100h is equal to 14 as described above. Accordingly, in the layer of the area defining area #0100h, the number of blocks being used is equal to 19 (=18+1), and the number of usable blocks is equal to 14. Therefore, the number of blocks allocated from the area defining area #0000h serving as the parent layer thereof is equal to 33 (=19+14).

On the other hand, as the code range of the area defining area #1000h of the manager B2 are allocated 1000h to 1FFFh in the code range from 0000h to FFFFh of the area defining area #0000h serving as the parent layer thereof. Here, since the code range of the area defining area of the manager B2 is from 1000h to 1FFFh, 1000h which is the minimum value of the above code range is set as the area code of the area defining area of the manager B2. Further, the empty capacity and area key of the area defining area #1000h are set to 43 and c0c0c0c0c0c0c0c0, respectively.

The layer of the area defining area #1000h of the manger B2 is provided with a service defining area for the service supply of the manager B2. 1022h in the code range from 1000h to 1FFFh of the area defining area #1000h is allocated as a service code to the service defining area.

The capacity of the service defining area to which the service code 1022h is allocated, that is, the service defining area #1022h is set to 4, and thus a service area constructed by user blocks of 4 can be used. Further, the service key of the service defining area #1022h is set to 0303030303030303.

Here, the capacity of the service area managed by the service defining area #1022h is equal to 4, and the service defining area #1022h itself uses one block as a service defining block, so that the number of blocks being used is equal to 5 (=4+1) because of existence of the service defining area #1022h. Further, the number of blocks usable by the area defining area #1000h of a layer to which the service defining area #1022h belongs is equal to 43 because the empty capacity thereof is equal to 43. Further, the area defining area #1000h itself uses one block as an area defining block. Accordingly, in the layer of the area defining area #1000h, the number of blocks being used is equal to 6 (=5+1), and the number of usable blocks is equal to 43, so that the number of blocks allocated to the area defining area #1000h is equal to 49 (=6+43).

Since the code range serving as the range of identification codes which can be allocated to an area defining area to be managed is stored in the area defining area as described above, such a layer structure as shown in FIG. 5 in which an area defining area of a management target is set as a child layer and an area defining area for managing the area defining area is set as a parent layer can be defined on the basis of the code range.

Figure 6:
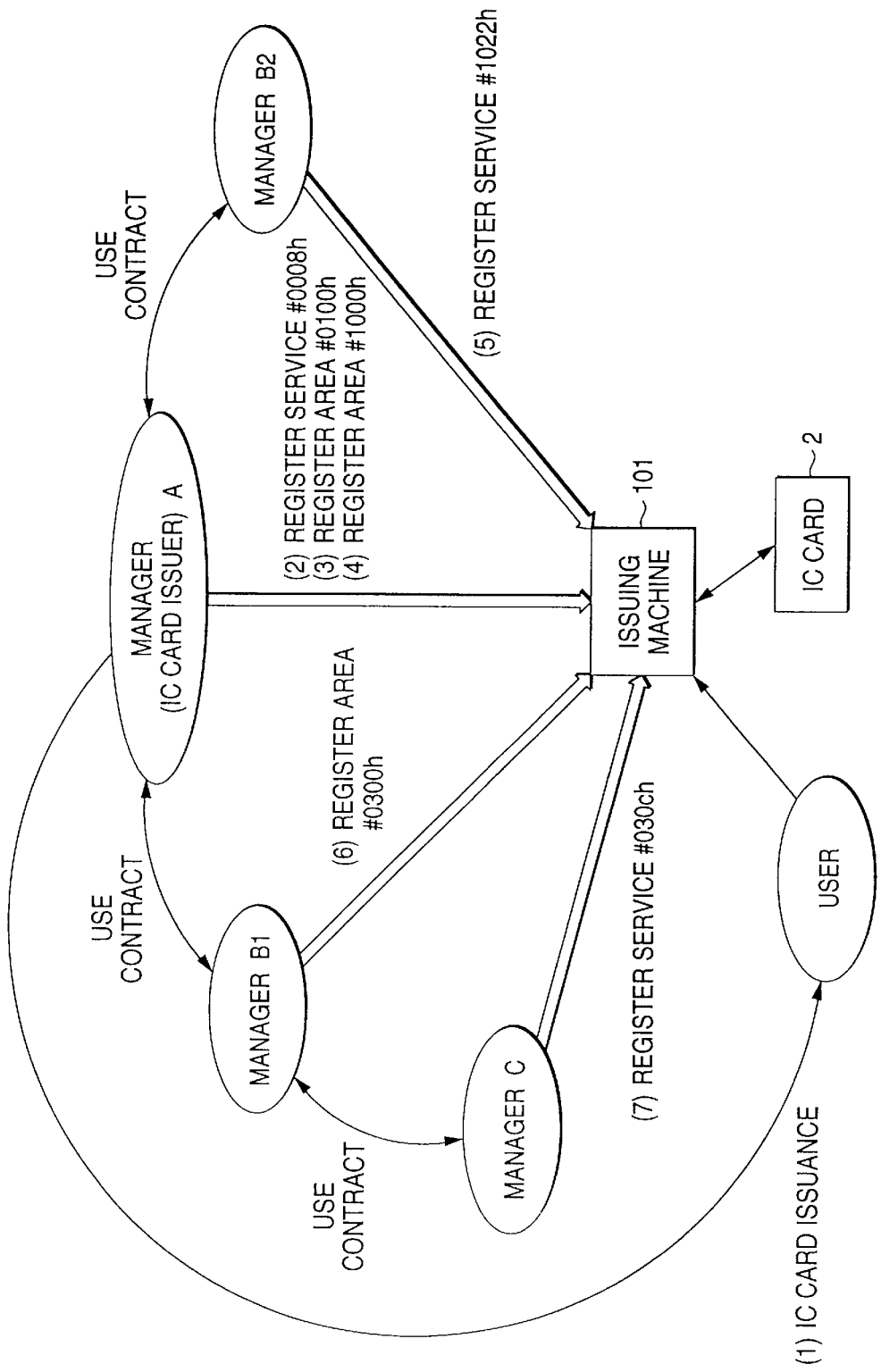
FIG. 6 is a diagram showing a process of constructing the layer structure of FIG. 5.

Next, a process of constructing the layer structure shown in FIG. 5 on the assumption that the manager A to which the area defining area #0000h of the uppermost layer is allocated is a supplier of an IC card 2 will be described with reference to FIG. 6.

The manager A issues the IC card 2 in accordance with the user's request (1). Only the area defining area #000h in the layer structure of FIG. 5 is formed in the IC card 2.

When the manager A starts to supply a predetermined service by using the service area managed by the service defining area #0008h, the manager A registers into the registered card issuing machine 101 information necessary to form the service defining area #0008h (2).

Here, the registered card issuing machine 101 is constructed by R/W1 and the controller 3 shown in FIG. 1, for example. The registered card issuing machine 101 may be disposed in a railway station, a retail store or other facilities.

Thereafter, when a user inserts an IC card 2 into a registered card issuing machine 101 (when the IC card 2 is set to be allowed to communicate with R/W 1 contained in the registered card issuing machine 101), the registered card issuing machine 101 transmits a command and necessary data to the IC card 2 on the basis of registered information to form the service defining area #0008h. Through the above operation, the user is allowed to be supplied with the service of the manager A by using the service area managed by the service defining area #0008h.

On the other hand, when the managers B1, B2 want to be supplied with the service using the IC card 2, each of them makes a contract with the manager A so that the manager A registers into the registered card issuing machine 101 information necessary to form the area defining areas #0100h and #1000h (3), (4). When a user inserts an IC card 2 into the registered card issuing machine 101, the registered card issuing machine 101 transmits a command and necessary data to the IC card 2 on the basis of the registered information to form the area defining areas #0100h and #1000h, whereby the managers B1 or B2 can use the resource of the IC card 2 in the range defined in the area defining area #0100h or #1000h.

Thereafter, when the manager B2 starts to supply a predetermined service by using the service area managed by the service defining area #1022h, the manager B2 registers into the registered card issuing machine 101 information necessary to form the service defining area #1022h (5). When a user inserts an IC card 2 into the registered card issuing machine 101, the registered card issuing machine 101 transmits a command and necessary data to the IC card 2 on the basis of the registered information to form the service defining area #1022h. Therefore, the user can be supplied with the service of the manager B2 using the service area managed by the service defining area #1022h.

Further, when the manager C wishes to supply a service through IC card 2 under the management of the manager B1, the manager C makes a contract with the manager B1 so that the manager B1 registers into the registered card issuing machine 101 information necessary to form the area defining area#0300h(6). When a user inserts an IC card 2 into the registered card issuing machine 101, the registered card issuing machine 101 transmits a command and necessary data to the IC card 2 on the basis of the registered information to form the area defining area #0300h, whereby the manager C can use the resource of the IC card 2 in the range defined in the area defining area #0300h.

Thereafter, when the manager C starts to supply a predetermined service by using the service area managed by the service defining area #030Ch, the manager C registers into the registered card issuing machine 101 information necessary to form the service defining area #030Ch (7). When a user inserts an IC card 2 into the registered card issuing machine 101, the registered card issuing machine 101 transmits a command and necessary data to the IC card 2 on the basis of the registered information to form the service defining area #030Ch, whereby the user can accept the supply of the service from the manager C using the service area managed by the service defining area #030Ch.

In the IC card 2, the area defining area and the service defining area are formed according to the command from the registered card issuing machine 101 as described above. The area forming processing of forming the area defining area and the service forming processing of forming the service defining area are performed by the sequencer 91, for example. The area forming processing and the service forming processing will be described with reference to FIGS. 7 and 8.

Figure 7:
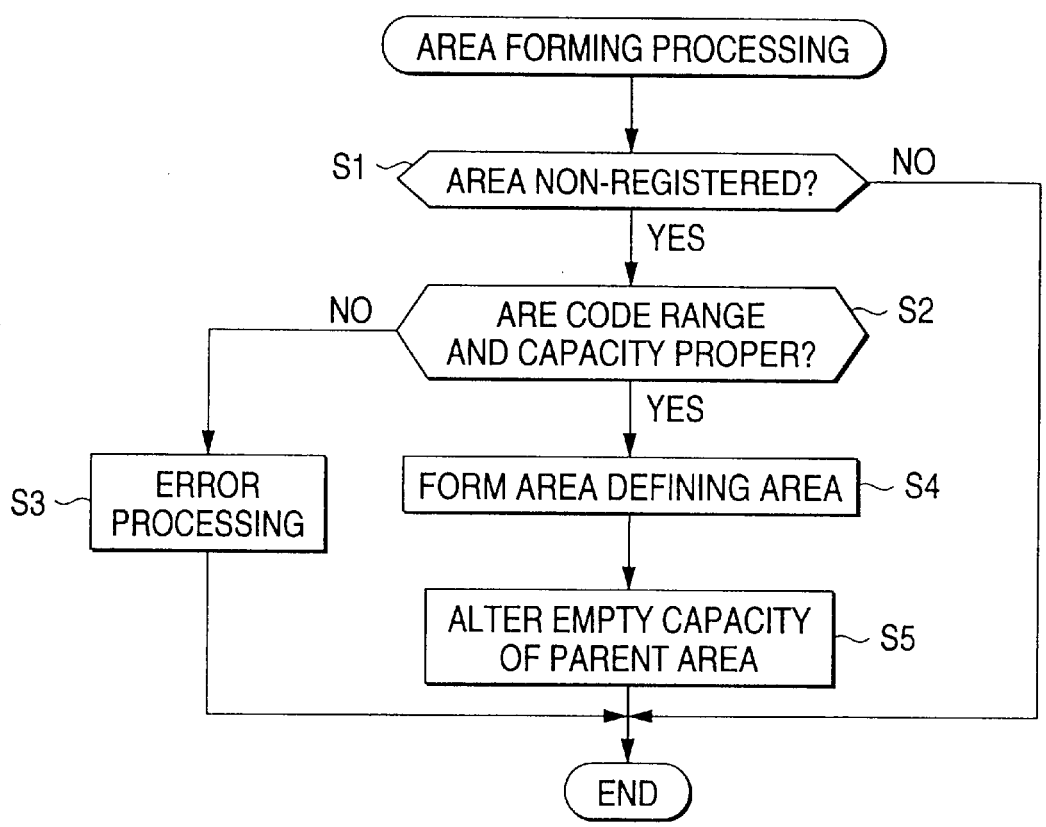
FIG. 7 is a flowchart showing area forming processing.

First, the area forming processing will be described with reference to the flowchart of FIG. 7.

When the IC card 2 is inserted into the registered card issuing machine 101, the registered card issuing machine 101 transmits to the IC card 2 a command instructing to form an area defining area (hereinafter referred to as a define, area forming command), information necessary to form the area defining area, that is, the code range of the area defining area to be formed, the number of blocks allocated to the area defining area (hereinafter referred to as allocation block number), an area key and an area code of an area defining area serving as the parent layer (hereinafter referred to as a parent area code), for example.

Here, from the viewpoint of the security, it is preferable that information necessary to form an area defining area is transmitted to the IC card 2 while being encrypted. The encryption may be performed by using the same key as the area key stored in the area defining area having the parent area code, for example. The area key stored in the area defining area having the parent area code is stored in EEPROM 66, so that the encrypted information can be decoded in the IC card 2.

When receiving the area forming command, the IC card 2 (sequencer 91) decodes the encrypted information transmitted together with the area forming command, thereby recognizing the parent area code and the code range, the allocation block and the area key of the area defining area to be formed. Further, in the IC card 2, the area code of the area defining area to be formed is recognized. That is, in this case, the minimum value of the code range of the area defining area to be formed is recognized as the area code thereof.

In the IC card 2, it is judged in step S1 whether the area defining area to be formed has been already formed in EEPROM 66. That is, in step S1 it is judged whether the area defining area having the same area code as the area code of the area defining area to be formed has been already formed.

If it is judged in step S1 that the area defining area to be formed has been already formed, the area forming processing is finished. That is, in the case where the area defining area to be formed has been already formed, no subsequent processing is carried out because it is unnecessary to duplicatively form the same area defining area.

If it is judged in step S1 that the area defining area to be formed has not yet been formed, the processing goes to step S2 to judge whether the code range of the area defining area to be formed and the number of allocated blocks (capacity) are proper or not. That is, it is judged in step S2 whether the code range of the area defining area to be formed is contained in the code range stored in the area defining area having the parent code and the allocation block number of the area defining area to be formed is below the empty capacity stored in the area defining area having the parent area code.

When it is judged in step S2 that the code range of the area defining area to be formed and the allocation block number are not proper, that is, when the code range of the area defining area to be formed is contained in the code range stored in the area defining area having the parent area code or the allocation block number of the area defining area to be formed exceeds the empty capacity stored in the area defining area having the parent area code, the error processing is carried out in step S3 and then the area forming processing is finished. That is, in step S3, a message in which the area defining area having the parent area code is set as a parent layer, but no area defining area serving as a child layer thereof can be formed is transmitted to the registered card issuing machine 101. Accordingly, in this case, no area defining area is formed.

On the other hand, if it is judged in step S2 that the code range of the area defining area to be formed and the allocation block number are proper, that is, it is judged that the code range of the area defining area to be formed is contained in the code range stored in the area defining area having the parent area code and the allocation block number of the area defining area to be formed is below the empty capacity stored in the area defining area having the parent area code, the area defining area to be formed is formed as a child layer of the layer (parent layer) of the area defining area having the parent area code in step S4.

That is, in step S4, the lowermost block (the empty block having the largest logical address) in the empty blocks of EEPROM 66 (FIG. 4) is ensured as the area defining block corresponding to the area defining area to be formed. Further, the code range, the empty capacity, the area key, etc. are written into the area defining bock. Here, in step S4, data transmitted from the registered card issuing machine 101 are directly written as the code range and the area key. The value obtained by subtracting 1 from the allocation block number transmitted from the registered card issuing machine 101 is written as the empty capacity. The value obtained by subtracting 1 from the allocation block number is written because the area defining area thus formed uses one block.

Thereafter, the processing goes to step S5 to rewrite the empty capacity of the area defining area of the parent area code, and then the area forming processing is finished. That is, in step S5, the value obtained by subtracting the allocation block number from the empty capacity of the area defining area having the parent area code is newly written as an empty capacity of the area defining area having the parent area code.

The area defining areas #0100h, #1000h, #0300h of the managers B1, B2, C shown in FIG. 5 are formed by the above area forming processing.

That is, assuming that at the issuance time of the IC card 2, the manager A who is also the issuer of the IC card 2 has all the resources of the IC card 2 and the identification codes or the capacity usable by the IC card 2 is from 0000h to FFFFh or 65533 blocks, only the area defining area #0000h of the uppermost layer in which the code range is from 0000h to FFFFh and the empty capacity is equal to 65532 exists as an area defining area at the issuance time of the IC card 2.

In this embodiment, as shown in FIG. 4, EEPROM 66 has blocks of 65536, however, the usable capacity is equal to 65533 blocks whose number is smaller than 65536 by 3 just after issuing the IC card 2 because the manufacturing ID block, the issuance ID block and the system defining block exist.

Further, the empty capacity of the area defining area #0000h of the uppermost layer is equal to 65532 blocks whose number is smaller than the usable capacity of 65533 blocks by one block because the area defining area #0000h itself uses one block.

When the manager A shares the manager B1 the identification codes in the range from 0100h to 03FFh and 33 blocks in the resources thereof, the area forming processing is carried out to form the area defining area #0100h. That is, in this case, 0100h to 03FFh and 32 blocks are written as a code range and an empty capacity respectively into the area defining area #0100h. The empty capacity is smaller than the number of 33 blocks shared from the manager A by one block because the area defining area #0100h itself uses one block.

When the area defining area #0100h is formed, the empty capacity of the area defining area #0000h of the manager A is reduced by 33 blocks shared to the manager B1.

When the manager A shares the manager B2 the identification codes of the range from 1000h to 1FFFh and 49 blocks, the area forming processing is carried out to form the area defining area #1000h. That is, in this case, 1000h to 1FFFh and 48 blocks are written as a code range and an empty capacity respectively into the area defining area #1000h. The empty capacity is smaller than the number of 49 blocks shared from the manager A by one block because the area defining area #1000h itself uses one block.

When the area defining area #1000h is formed, the empty capacity of the area defining area #0000h of the manager A is reduced by 33 blocks shared from the manager B2.

When the area defining area #0100h or #1000h is formed as described above, the manager B1 or B2 is allowed to form in the layer of the area defining area #0100h or #1000h an area defining area and a service defining area as child layers of the above layer.

For example, when the manager B1 shares the manager C the identification codes of the range from 0300h to 03FFh and 18 blocks, the area forming processing is carried out to form the area defining area #0300h. That is, in this case, 0300h to 03FFh and 17 blocks are written as a code range and an empty capacity into the area defining area #0300h. The empty capacity is smaller than the number of 18 blocks shared from the manager B1 by one block because the area defining area #0300h itself uses one block.

When the area defining area #0300h is formed, the empty capacity of the area defining area #0100h of the manager B1 is reduced by the number of 18 blocks shared from the manager C. That is, as described above, the empty capacity of the area defining area #0100h is equal to 32 blocks when the area defining area #0100h is formed. However, as shown in FIG. 5, 18 blocks are reduced from the empty capacity and thus the empty capacity is equal to 14 blocks.

Figure 8:
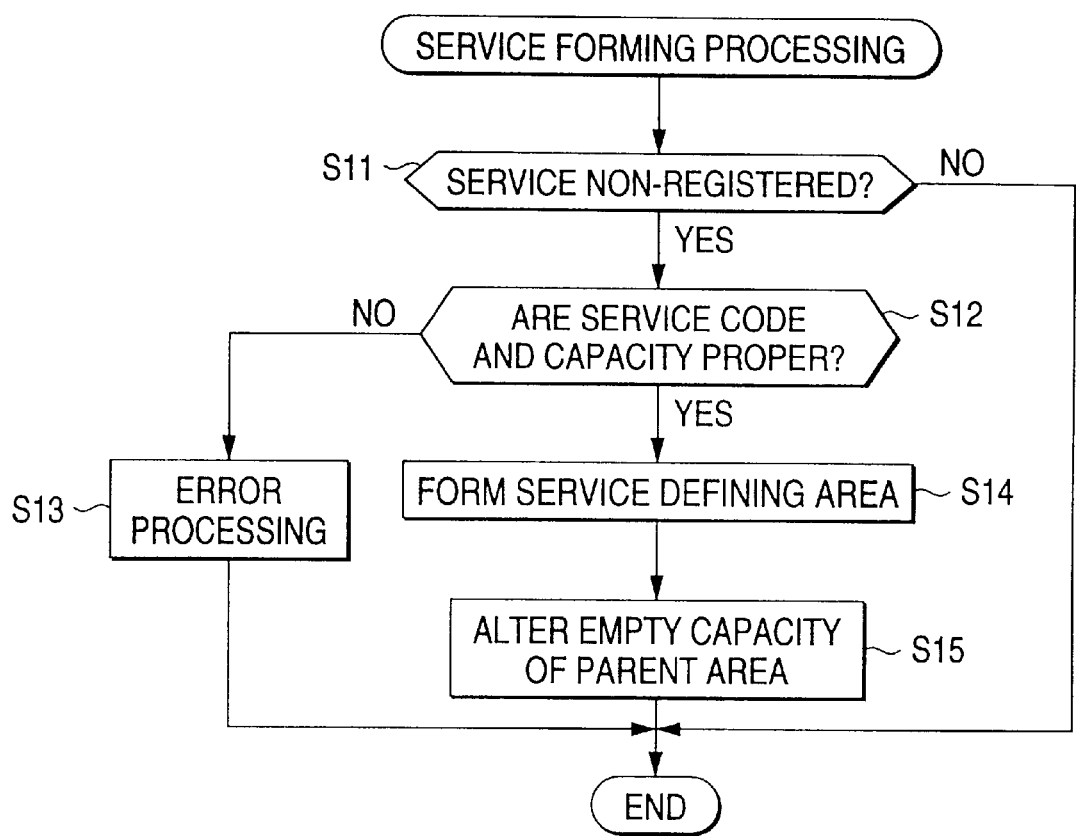
FIG. 8 is a flowchart showing service forming processing.

Next, the service forming processing will be described with reference to the flowchart of FIG. 8.

When the IC card 2 is inserted into the registered card issuing machine 101, the registered card issuing machine 101 transmits to the IC card 2 a command instructing to form a service defining area (hereinafter referred to as a service forming command), information necessary to form the service defining area, that is, a service code of the service defining area to be formed, the number of blocks allocated to the service defining area (hereinafter referred to as allocation block number), the service key, the area code of the area defining area of the layer in which the service defining area is formed (hereinafter referred to as a parent area code), etc.

Here, from the viewpoint of the security, it is preferable that information necessary to form the service defining area is transmitted to the IC card 2 while encrypted by using the same key as the area key stored in the area defining area having the parent area code as in the case of the area forming processing.

When the service forming command is received, the IC card 2 (sequencer 91) decodes the encrypted information transmitted together with the service forming command, thereby recognizing the parent area code, and the service code, the allocation block number and the service key of the service defining area to be formed.

In the IC card 2, it is judged in step S11 whether the service defining area to be formed has been already formed in EEPROM 66. That is, it is judged in the step S11 whether a service defining area having the same service code as the service defining area to be formed has been already formed.

When it is judged in the step S11 that the service defining area to be formed has been already formed, the service forming processing is finished. That is, when the service defining area to be formed has been already formed, the subsequent processing is not carried out because it is not necessary to duplicatively form the same service defining area.

Further, if it is judged in step S11 that the service defining area to be formed has not been formed, the processing goes to step S12 to judge whether the service code of the service defining area to be formed and the allocation block number (capacity) are proper or not. That is, it is judged in step S12 whether the service code of the service defining area to be formed is contained in the code range stored in the area defining area having the parent area code and the allocation block number of the service defining are to be formed is below the empty capacity stored in the area defining area having the parent area code.

If it is judged in step S12 that the service code of the service defining area to be formed and the allocation block number are not proper, that is, if the service code of the service defining area to be formed is not contained in the code range stored in the area defining area of the parent layer or the allocation block number of the service defining area to be formed exceeds the empty capacity stored in the area defining area of the parent layer, the processing goes to step S13 to perform the error processing, and then the area forming processing is finished. That is, a message in which service defining area cannot be formed in the layer of the area defining area of the parent layer is transmitted to the registered card issuing machine 101. Accordingly, in this case, service defining area cannot be formed.

On the other hand, it is judged in step S12 that the service code of the service defining area to be formed and the allocation block number are proper, that is, if the service code of the service defining area to be formed is contained in the code stored in the area defining area having the parent area code and the allocation block number of the service defining area to be formed is below the empty capacity stored in the area defining area of the parent area code, the processing goes to step S14 in which the service defining area to be formed is formed in the layer of the area defining area having the parent area code.

That is, in step S14, the lowermost block (an empty block having the largest logical address) in the empty blocks of EEPROM 66 (FIG. 4) is ensured as the service defining block corresponding to the service defining area to be formed. Further, the service code, the capacity, the service key, etc. are written into the service defining block. In this case, in step S14, the service code and the service key transmitted from the registered card issuing machine 101 are directly written. The value obtained by subtracting from the allocation block number transmitted from the registered card issuing machine 101 by 1 is written as the capacity. The value obtained by subtracting the allocation block number by 1 is written because the service defining area to be formed uses one block.

In step S14, empty blocks whose number corresponds to the capacity written in the service defining area thus formed are selected in logical-address increasing order, and ensured as user blocks constituting the service area managed by the service defining area. Thereafter, the processing goes to step S15.

In step S15, the empty capacity of the area defining area having the parent area code is rewritten, and the service forming processing is finished. That is, in step S15, the value obtained by subtracting the allocation block number from the empty capacity of the area defining area having the parent area code is newly written as the empty capacity of the area defining area.

The service defining areas #0008h, #1022h, #030Ch of the managers A, B2, C shown in FIG. 5 are formed by performing the above service forming processing.

That is, when the manager A supplies its services by using the identification code of 0008h and the capacity of 9 blocks in the resources thereof, the service forming processing is carried out to form the service defining area #0008h, and 8 blocks are written as a capacity into the service defining area #0008h. Further, eight empty blocks are ensured as user blocks, and set as a service area managed by the area defining area #0008h. The capacity written in the service defining area #0008h is smaller than the number of 9 blocks by one block because the service defining area #0008h uses one block.

When the service defining area #0008h is formed, the empty capacity of the area defining area #0000h of the manager A is reduced by nine blocks which are shared to the service defining area #0008h.

As described above, the manager A can supply services by using the service area of eight blocks managed by the service defining area #0008h.

When the manager B2 supplies services by using the identification code of 1022h and a capacity of 5 blocks in the resources thereof, the service forming processing is carried out to form the service defining area #1022h, and 4 blocks are written as a capacity into the service defining area #1022h. Further, four empty blocks are ensured as user blocks and it is set as a service area managed by the area defining area #1022h. The capacity written in the service defining area #1022h is smaller than the number of 5 blocks by one block because the service defining area #1022h itself uses one block.

When the service defining area #1022h is formed, the empty capacity of the area defining area #1000h of the manager B2 is reduced by 5 blocks shared to the service defining area #1022h. That is, as described above, the empty capacity is equal to 48 blocks at the time when the area defining area #1000h is formed, however, it is reduced by 5 blocks and thus equal to 43 blocks as shown in FIG. 5.

As described above, the manager B2 is allowed to supply services by using the service area of four blocks managed by the service defining area #1022h.

Further, when the manager C supplies services by using, for example, the identification code of 030Ch and the capacity of 17 blocks in the resources thereof, the service forming processing is carried out to form the service defining area #030Ch, and 16 blocks are written as a capacity into the service defining area #030Ch. Further, 16 empty blocks are ensured as user blocks, and it is set as a service area managed by the area defining area #030Ch. The capacity written in the service defining area #030Ch is smaller than the number of 17 blocks by one block because the service defining area #030Ch itself uses one block.

When the service defining area #030Ch is formed, the empty capacity of the area defining area #0300h of the manager C is reduced by 17 blocks shared to the service defining area #030Ch. That is, as described above, the empty capacity is equal to 17 blocks at the time when the area defining area #0300h is formed, however, it is reduced by 17 blocks and thus equal to zero as shown in FIG. 5.

As described above, the manager C is allowed to supply services by using the service area of 16 blocks managed by the service defining area #030Ch.

As described above, EEPROM 66 is managed on the basis of the area defining area in which the code range and the empty capacity are stored, so that the resource management of the IC card 2 can be performed. That is, the capacity and identification codes which are usable in the layer of an area defining area can be restricted. As a result, even when a manager shares a part of resources allocated thereto (in this case, usable capacity and identification codes) to another manager so that the IC card 2 is commonly usable, the identification code can be prevented from being overlapped between different managers and the manager can be prevented from using EEPROM 66 with exceeding a capacity which is predetermined through a contract or the like.

In the IC card 2, the storage area of EEPROM 66 has the layer structure in which the area defining area is layered as described with respect to FIG. 5, and keys for certification (in this embodiment, a key for an area defining area and a key for a service defining area are referred to as an area key and a service key respectively) are stored in the area defining area and the service defining area respectively, so that access control which is high in flexibility and safety to the IC card 2 can be performed.

Figure 9:
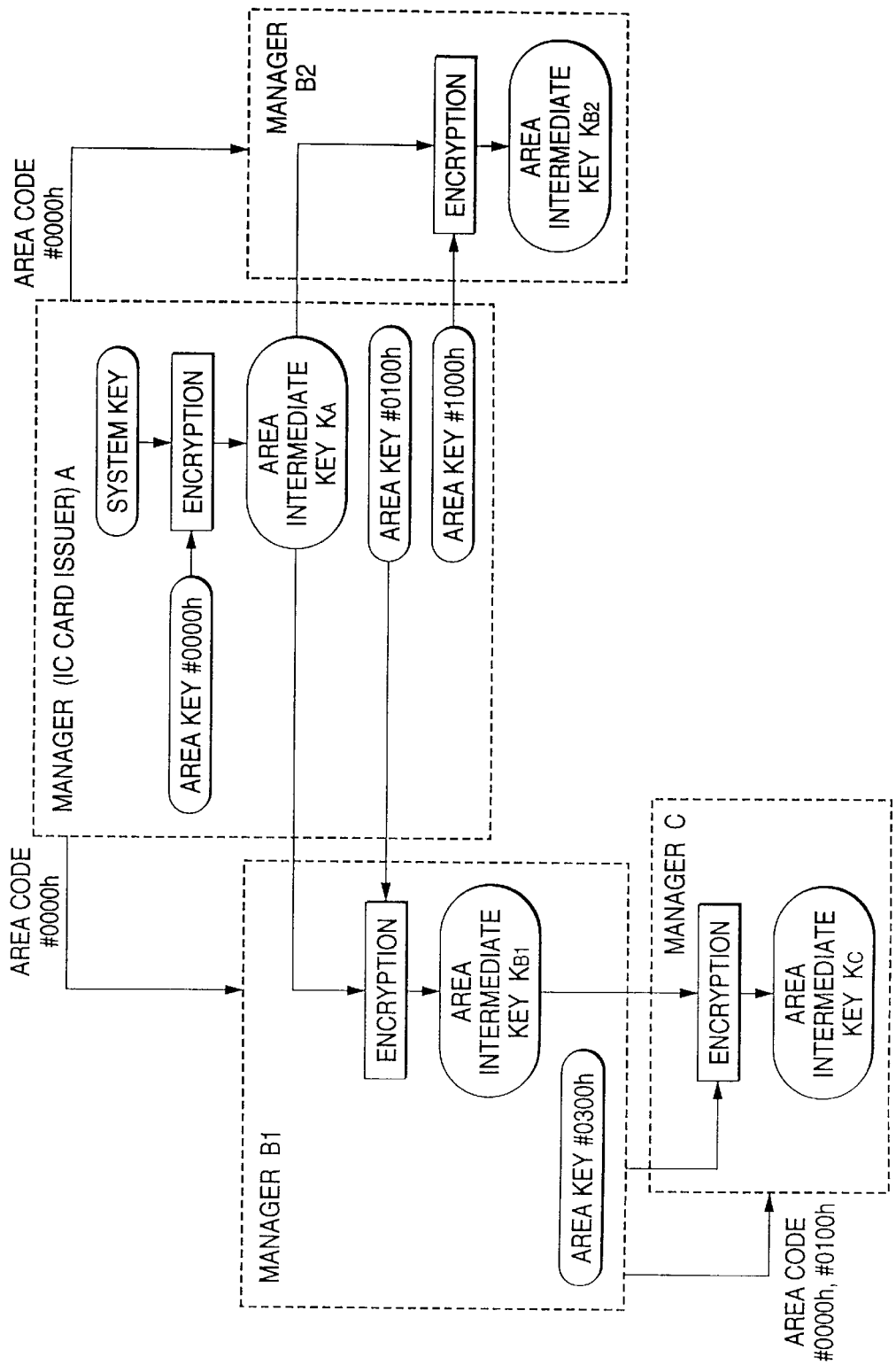
FIG. 9 is a diagram showing key reception/delivery between managers.

That is, access control which is high in flexibility and safety to the IC card 2 can be implemented by delivering information as shown in FIG. 9 between managers.

Specifically, the manager A which also serves as the issuer of the IC card 2 determines a system key to be stored in the system defining block of EEPROM 66 (FIG. 4) and an area key of the area defining area #0000h of itself, and stores the system key in the system defining block while storing the area key #0000h in the area defining area #0000h. Here, the area key of the area defining area #xxxxh is hereinafter referred to as area key #xxxxh.

Further, the manager A encrypts the system key with the area key #0000h and generates an area intermediate key $K_A$. DES (Data Encryption Standard), FEAL (Fast Data Encipherment Algorithm) or the like may be used as an encrypting method.

When the manager A shares the resources thereof to the manager B1, the manager A gives the area intermediate key $K_a$ to the manager B1. Further, the manager A determines the area key #0100h of the manager B1 and gives (distributes) it to the manager B1 together with the area code #0000h thereof.

Accordingly, the manager B1 can recognize the area intermediate key $K_A$ and the area key #0100h thereof, however it cannot recognize the system key and the area key #0000h of the manager A which is a so-called parent. However, the area key #0100h of the manager B1 is given to the manager B1 serving as a so-called parent by the manager A serving as the parent, and thus the manager A serving as the parent recognizes the area key #0100h of the manager B1 serving as the child.

The area key #0100h given to the manager B1 by the manager A is written into the area defining area #0100h through the area forming processing (FIG. 7) of the area defining area #0100h of the manager B1.

The manager B1 encrypts the area intermediate key $K_A$ obtained from the manager A serving as the parent thereof on the basis of the area key #0100h obtained from the manager A to generate an area intermediate key $K_{B1}$.

The manager A also gives the area intermediate key $K_A$ to the manager B2 when it shares the resources thereof to the manager B2. Further, the manager A determines the area key #1000h of the manager B2, and gives it to the manager B2 together with the area code #0000h thereof.

Accordingly, the manager B2 can recognize the area intermediate key $K_A$ and the area key #1000h thereof, however, cannot recognize the system key and the area key #0000h of the manager A serving as the parent. However, since the area key #1000h of the manager B2 is given to the manager B2 serving as the child by the manager A serving as the parent, the manager A serving as the parent recognizes the area key #1000h of the manager B2 serving as the child.

The area key #1000h given to the manager B2 by the manager A is written into the area defining area #1000h thereof in the area forming processing of the area defining area #1000h of the manager B2.

The manager B2 encrypts the area intermediate key $K_A$ obtained from the manager A serving as the parent thereof on the basis of the area key #1000h obtained from the manager A to generate an area intermediate key $K_{B2}$.

On the other hand, when the manager B1 shares the resources thereof to the manager C, the manager B1 gives the area intermediate key $K_{B1}$ to the manager C. Further, the manager B1 determines the area key #0300h of the manager C and gives it to the manager C together with the area code #0100h thereof and the area code #0000h of the manager A serving as the parent.

Accordingly, the manager C can recognize the area intermediate key $K_{B1}$ and the area key #03000h thereof, however, cannot recognize the area key #0100h of the manager B1 serving as the parent. However, since the area key #0100h is given to the manager C serving as the child by the manager B1 serving as the parent, the manager B1 serving as the parent recognizes the area key #0300h of the manager C serving as the child.

The area key #0300h given to the manager C by the manager B1 is written in the area defining area #0300h thereof through the area forming processing of the area defining area #0300h of the manager C.

The manager C encrypts the area intermediate key $K_{B1}$ obtained from the manager B1 serving as the parent on the basis of the area key #0300h obtained from the manager B1 to generate an area intermediate key $K_C$.

Figure 10:
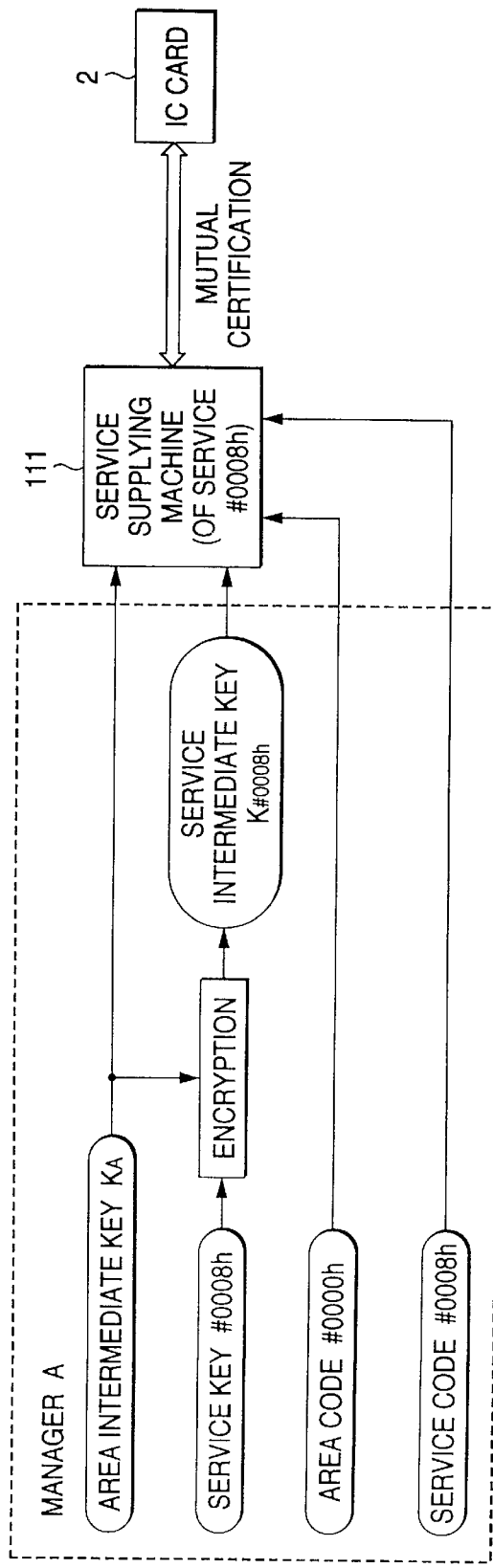
FIG. 10 is a diagram showing information necessary when a manager A supplies services.

When the manager A supplies its services by using the service area managed by the service defining area #0008h formed in the layer of the area defining area #0000h thereof as shown in FIG. 10, the manager A encrypts the service key stored in the service defining area #0008h (the service key stored in the service defining area #xxxxh is hereinafter referred to as a service key #xxxxh) on the basis of the area intermediate key $K_A$ to generate a service intermediate key $K_{\#0008h}$, and registers it into a service supply machine 111 together with the area intermediate key $K_A$. Further, the manager A registers the area code #0000h of the area defining area #0000h thereof and the service code #0008h of the service defining area #0008h formed in the layer of the area defining area #0000h into the service supply machine 111.

Here, the service supply machine 111 is constructed by R/W 1 and the controller 3 shown in FIG. 1, for example, and data are read/written from/in a predetermined service area to supply a predetermines service.

In this case, when the IC card 2 is inserted into the service supply machine 111, the following mutual certification is carried out between the service supply machine 111 and the IC card 2.

Figure 11:
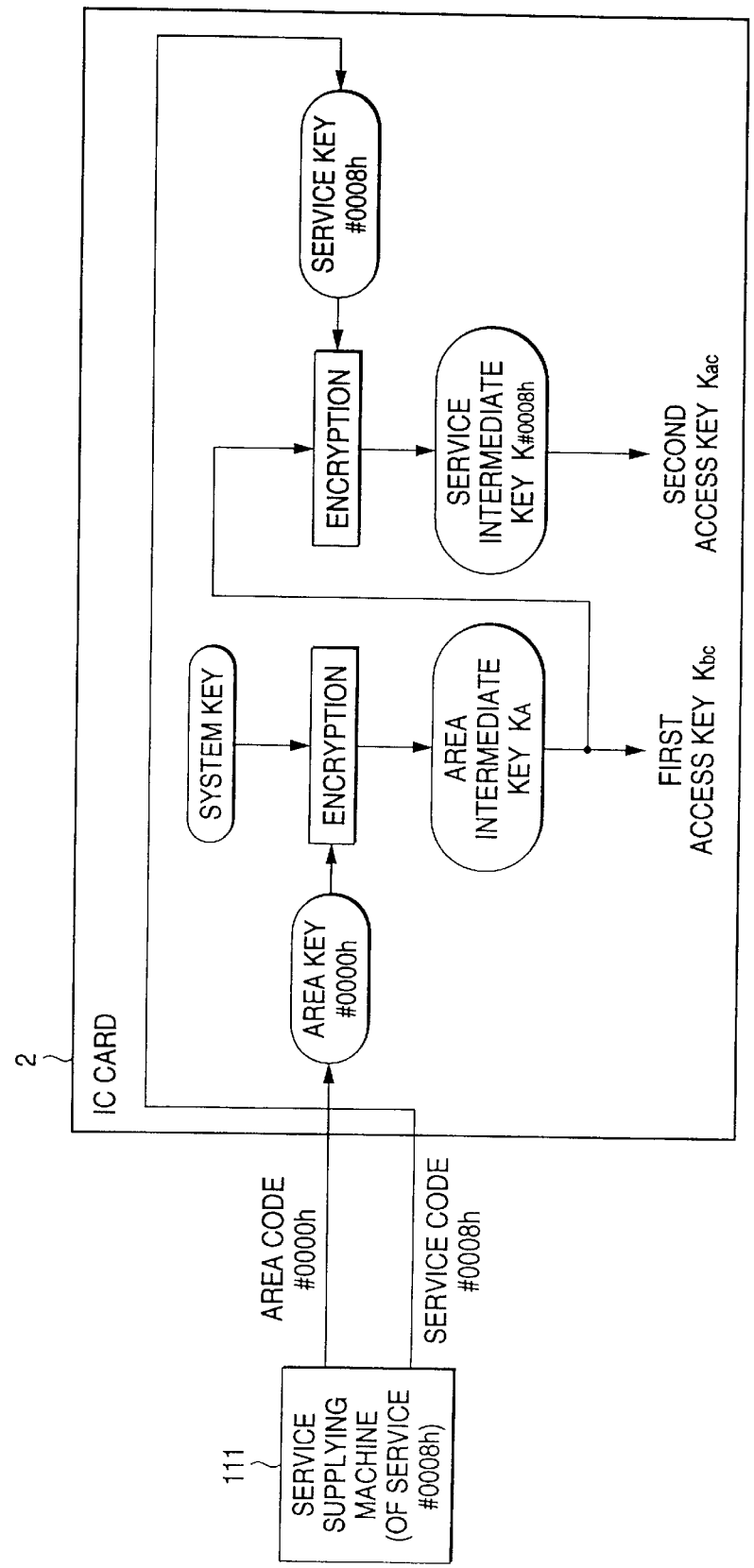
FIG. 11 is a diagram showing the processing of the IC card 2 when the manager A supplies services.

That is, the service supply machine 111 as shown in FIG. 11, transmits the area code #0000h and the service code #0008h registered to the IC card 2. In the IC card 2 (sequence 91), the area code #0000h and the service code #0008h from the service supply machine 111 are received.

In the IC card 2, the system key stored in the system defining block (FIG. 4) is readout, and also the area key #0000h is read out from the area defining area having the area code #0000h received from the service supply machine 111. Further, the system key is encrypted on the basis of the area key #0000h, so that the same key as the area intermediate key $K_A$ registered in the service supply machine 111 of FIG. 10 is generated. The same key as the area intermediate key $K_A$ is set as a first access key (certification key) $K_{bc}$ used for certification.

In the IC card 2, the service key #0008h is read from the service defining area having the service code #0008h received from the service supply machine 111. The area intermediate key $K_a$ is encrypted on the basis of the service key #0008h, so that the same key as the service intermediate key $K_{\#0008h}$ registered in the service supply machine 111 of FIG. 10 is generated. The same key as the service intermediate key $K_{\#0008h}$ is set as a second access key $K_{ac}$ used for certification.

Accordingly, in this case, the area intermediate key $K_A$ or the service intermediate key $K_{\#0008h}$ which serves as the first access key $K_{bc}$ or the second access key $K_{ac}$ is registered in the service supply machine 111, whereby the area intermediate key $K_A$ or the service intermediate key $K_{\#0008h}$ serving as the first access key $K_{bc}$ or the second access key $K_{ac}$ is generated in the IC card 2.

Figure 12:
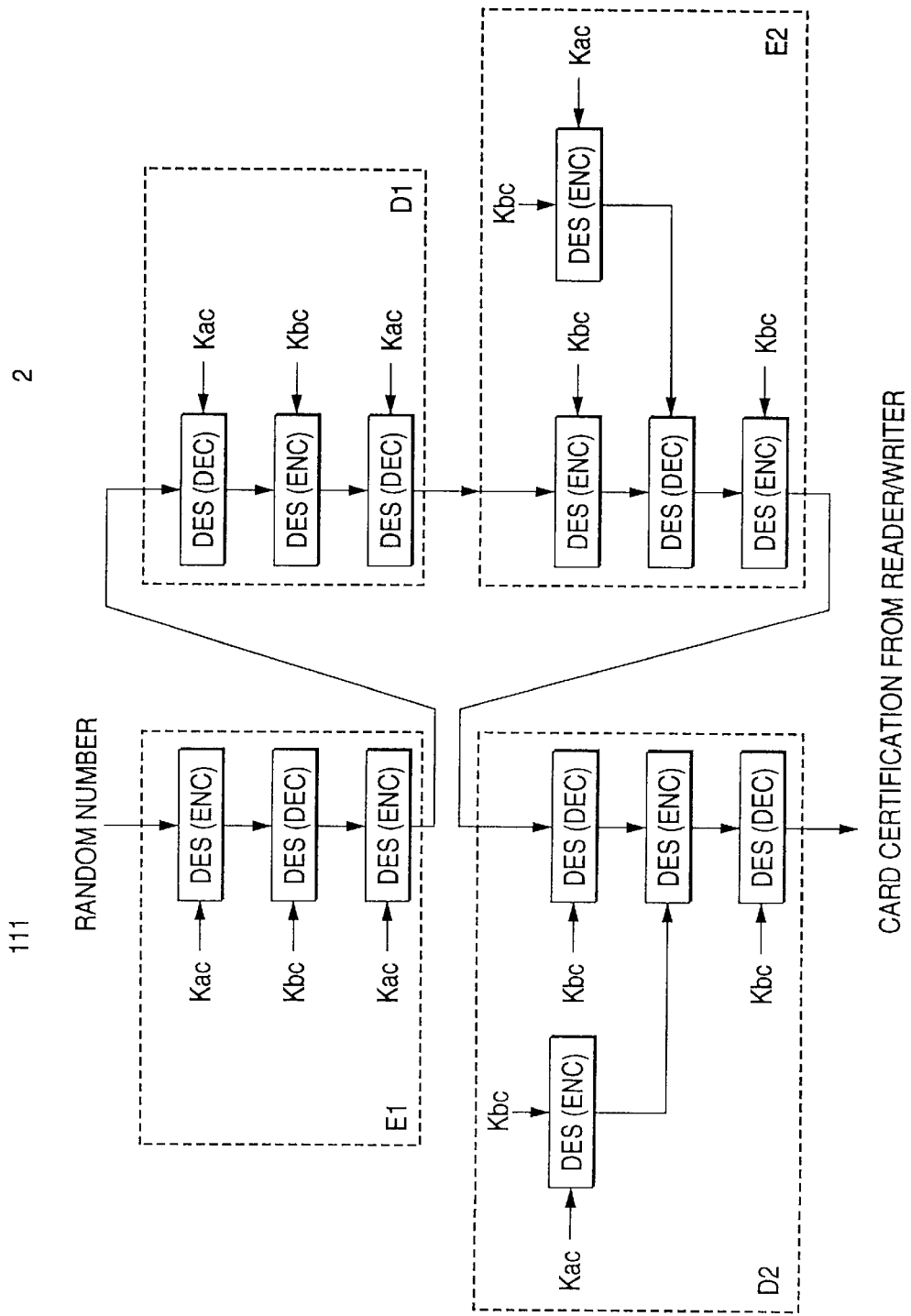
FIG. 12 is a diagram showing a certification method of the IC card 2 by a service supply apparatus 111.

The service supply machine 111 certificates the IC card 2 as shown in FIG. 12, for example.

That is, in the service supply machine 111, a random number is generated, and it is converted according to an algorithm E1. That is, The random number is encrypted (for example, DES-encrypted) on the basis of the second access key $K_{ac}$, and the encryption result is decoded (for example, DES-decoded) on the basis of the first access key $K_{bc}$. The decoding result is encrypted on the basis of the second access key $K_{ac}$. The conversion result of the random number based on the algorithm E1 is transmitted to the IC card 2.

In the IC card 2, the conversion result of the random number based on the algorithm E1 from the service device 111 is converted according to the algorithm D1. That is, the conversion result based on the algorithm E1 is decoded on the basis of the second access key $K_{ac}$, and the decoding result is encrypted on the basis of the first access key $K_{bc}$. Further, the encryption result is decoded on the basis of the second key $K_{ac}$.

In the IC card 2, the conversion result based on the algorithm D1 is further converted according to the algorithm E2. That is, the conversion result based on the algorithm D1 is encrypted on the basis of the first access key $K_{bc}$, and the first access key $K_{bc}$ is encrypted on the basis of the second access key $K_{ac}$. The encryption result based on the first access key $K_{bc}$ for the conversion result based on the algorithm D1 is decoded on the basis of the encryption result based on the second access key $K_{ac}$ of the first access key $K_{bc}$. The decoding result is encrypted on the basis of the first access key $K_{bc}$ and transmitted to the service supply machine 111.

In the service supply machine 111, the conversion result based on the algorithm E2 from the IC card 2 is converted according to the algorithm D2. That is, the conversion result based on the algorithm E2 is decoded on the basis of the first access key $K_{bc}$, and the first access key $K_{bc}$ is encrypted on the basis of the second access key $K_{ac}$. The decoding result based on the first access key $K_{bc}$ for the conversion result based on the algorithm E2 is encrypted on the basis of the encryption result of the first access key $K_{bc}$ based on the second access key $K_{ac}$. The encryption result is decoded on the basis of the first access key $K_{bc}$.

In the service supply machine 111, the original random number and the conversion result based on the algorithm D2 are compared with each other to certificate the IC card 2. That is, when the original number is coincident with the conversion result based on the algorithm D2, it is recognized that the IC card 2 is proper. On the other hand, if they are not coincident with each other, the IC card 2 is regarded as being improper (for example, it is forged).

Figure 13:
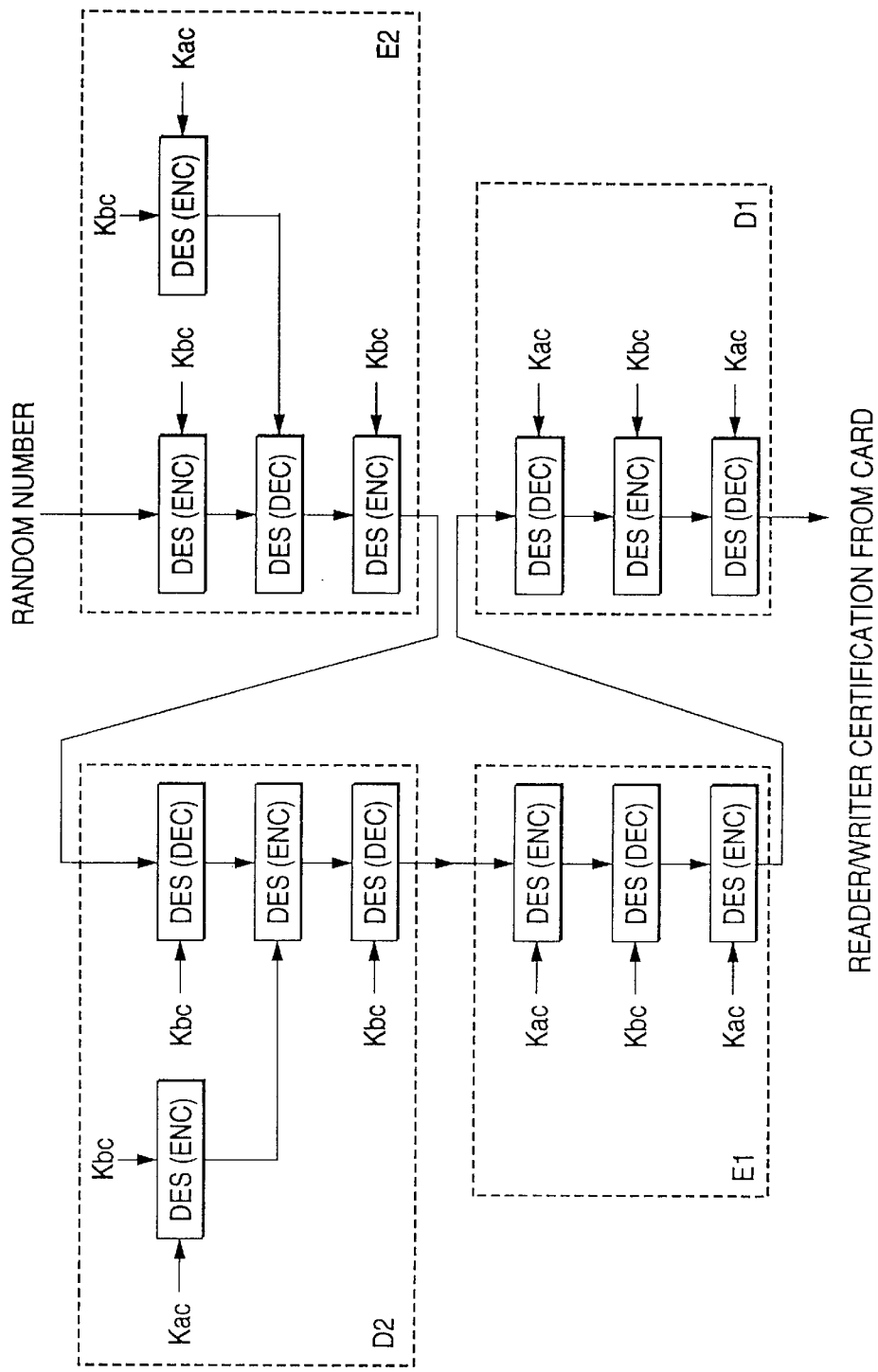
FIG. 13 is a diagram showing the certification method of the service supply apparatus 111 by the IC card 2.

If the IC card 2 is recognized to be proper, the certification of the service supply machine 111 is carried out in the IC card 2 as shown in FIG. 13, for example, That is, in the IC card 2, the random number is generated, and the random number is converted according to the algorithm E2 and transmitted to the service supply machine 111.

In the service supply machine 111, the conversion result of the random number based on the algorithm E2 from the IC card 2 is converted according to the algorithm D2. Further, the conversion result based on the algorithm D2 is converted according to the algorithm E1 and transmitted to the IC card 2.

In the IC card 2, the conversion result based on the algorithm E1 from the service supply machine 111 is converted according to the algorithm D1, and the conversion result and the original random number are compared with each other to perform the certification for the service supply machine 111. That is, when the original random number is coincident with the conversion result based on the algorithm D2, the service supply machine 111 is recognized as being proper. On the other hand, if they are not coincident with each other, the service supply machine 111 is recognized as being improper (for example, modified).

When both of the IC card 2 and the service supply machine 111 are recognized to be proper, an access to only the service area managed by the service defining area having the service code transmitted from the service supply machine 111 is permitted in the IC card 2. Accordingly, in the case described with respect to FIGS. 10 and 11, an access to only the service area managed by the service defining area #0008h is possible.

That is, the manager A who knows the area intermediate key $K_A$, the area code #0000h, the service key #0008h and the service code #0008h can access the service area managed by the service defining area #0008h. However, the manager A knows neither the service key #1022h nor the service key #030Ch, so that it cannot basically access the service area managed by the service defining area #1022h or #030Ch.

Figure 14:
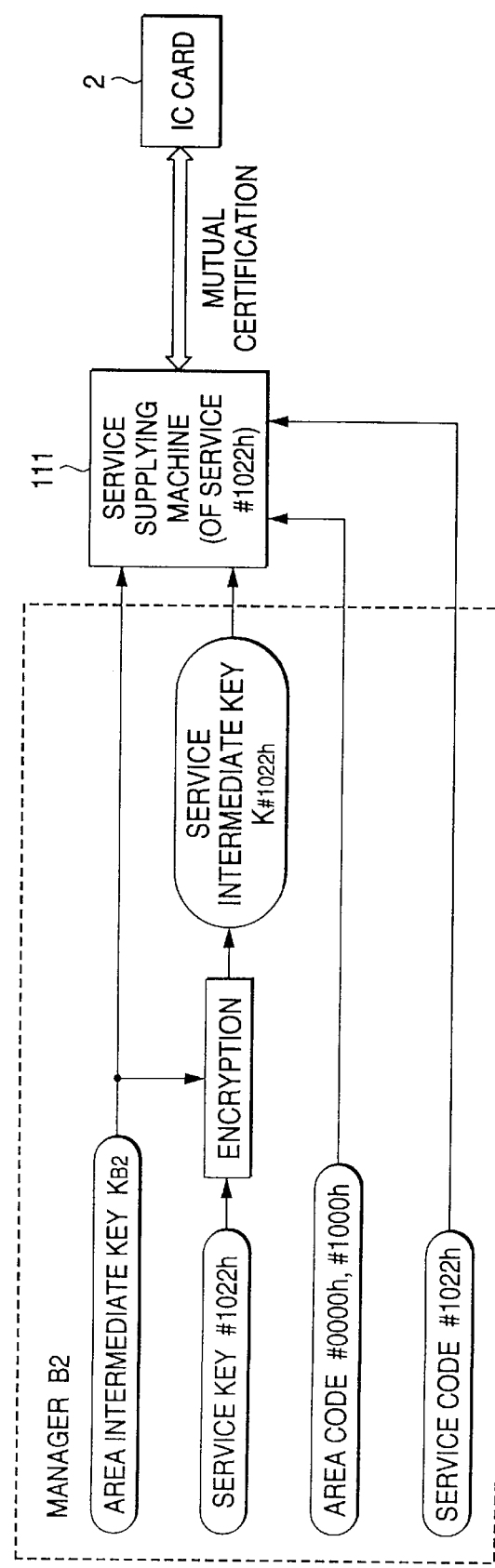
FIG. 14 is a diagram showing information necessary when a manager B2 supplies services.

Next, when the manager B2 supplies its services by using the service area managed by the service defining area #1022h formed in the layer of the area defining area #1000h thereof, it encrypts the service key #1022h stored in the service defining area #1022h on the basis of the area intermediate key $K_{B2}$ as shown in FIG. 14 to generate a service intermediate key $K_{\#1022h}$ and register it together with the area intermediate key $K_{B2}$ into the service supply machine 111. The manager B2 registers into the service supply machine 111 the area code of the area defining area of an upper layer above the layer of the area defining area #1000h thereof, that is, in this case, the area code #000h of the area defining area #0000h of the manager A and the area code #1000h of the area defining area #1000h thereof, and the service code #1022h of the service defining area #1022h formed in the layer of the area defining area #1000h.

In this case, when the IC card 2 is inserted into the service supply machine 111, the following mutual certification is carried out between the service supply machine 111 and the IC card 2.

Figure 15:
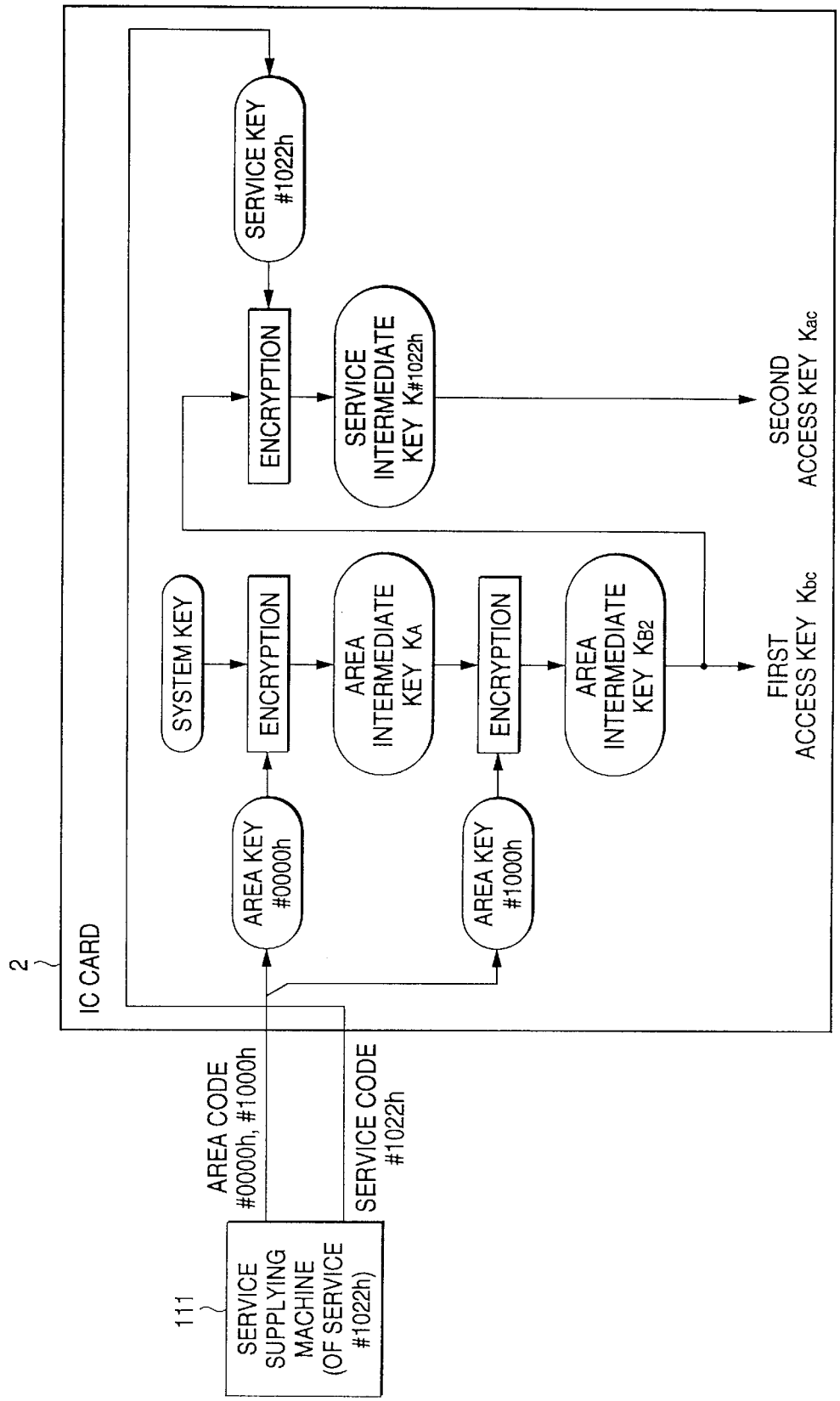
FIG. 15 is a diagram showing the processing of the IC card 2 when the manager B2 supplies services.

That is, as shown in FIG. 15, the service supply machine 111 transmits the registered area codes #0000h and #1000h and the service code #1022h to the IC card 2. In the IC card 2 (sequencer 91), the area codes #0000h and #1000h and the service code #1022h are received from the service supply machine 111.

In the IC card 2, the system key stored in the system defining block (FIG. 4) is read out, and the area key #0000h or #1000h is read out from the area defining area having the area code #0000h or #1000h received from the service supply machine 111. Further, the system key is encrypted on the basis of the area key #0000h, so that the same key as the area intermediate key $K_A$ is generated. The same key as the area intermediate key $K_A$ is encrypted on the basis of the area key #1000h, so that the same key as the area intermediate key $K_{B2}$ registered in the service supply machine 111 of FIG. 14 is generated. The same key as the area intermediate key $K_{B2}$ is set as a first access key $K_{bc}$ used for certification.

In the IC card 2, the service key #1022h is read out from the service defining area having the service code #1022h received from the service supply machine 111. The same key as the area intermediate key $K_{B2}$ is encrypted on the basis of the service key #1022h, so that the same key as the service intermediate key $K_{\#1022h}$ registered in the service supply machine 111 of FIG. 14 is generated. The same key as the service intermediate key $K_{\#1022}$h is set as a second access key $K_{ac}$ used for certification.

Accordingly, in this case, the area intermediate key $K_{B2}$ or the service intermediate key $K_{\#1022h}$ which is the first access key $K_{bc}$ or the second access key $K_{ac}$ is registered in the service supply machine 111, and in the IC card 2 the area intermediate key $K_{B2}$ or the service intermediate key $K_{\#1022h}$ which is the first access key $K_{bc}$ or the second access key $K_{ac}$ is generated.

The mutual certification is carried out between the IC card 2 and the service supply machine 111 as in the case as described with reference to FIGS. 12 and 13.

As a result of the mutual certification, when both the IC card 2 and the service supply machine 111 are recognized to be proper, the access to only the service area managed by the service defining area having the service code transmitted from the service supply machine 111 is permitted in the IC card 2. Accordingly, in the case of FIGS. 14 and 15, the access to only the service area managed by the service defining area #1022h is possible.

That is, the manager B2 who knows the area intermediate key $K_{B2}$, the area codes #0000h, #1000h, the service key #1022h and the service code #1022h can access the service area managed by the service defining area #1022h. However, the manager B2 knows neither the service key #0008h nor #030Ch, and thus it cannot basically access the service areas managed by the service defining areas #0008h and #030Ch.

Figure 16:
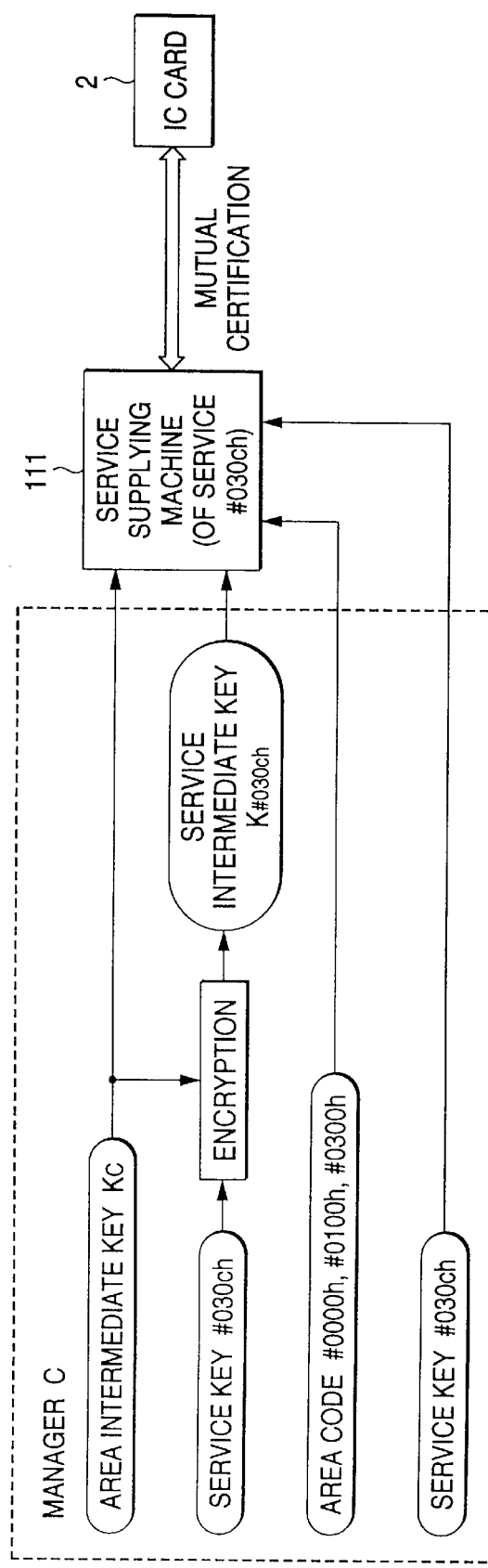
FIG. 16 is a diagram showing information necessary when a manager C supplies services.

Next, when the manager C supplies the services by using the service area managed by the service defining area #030Ch formed in the layer of the area defining area #0300h thereof, it encrypts the service key #030Ch stored in the service defining area #030Ch on the basis of the area intermediate key $K_C$ as shown in FIG. 16 to generate a service intermediate key $K_{\#030Ch}$, and registers it together with the area intermediate key $K_C$ into the service supply machine 111. The manager C also registers into the service supply machine 111 the area code of the area defining area of an upper layer above the layer of the area defining area #0300h thereof, that is, in this case, the area code #0000h of the area defining area #0000h of the manager A, the area code 0100h of the area defining area #0100h of the manager B1, the area code #0300h of the area defining area #0300h thereof and the service code #030Ch of the service defining area #030Ch formed in the layer of the area defining area #0300h.

In this case, when the IC card 2 is inserted into the service supply machine 111, the following mutual certification is carried out between the service supply machine 111 and the IC card 2.

Figure 17:
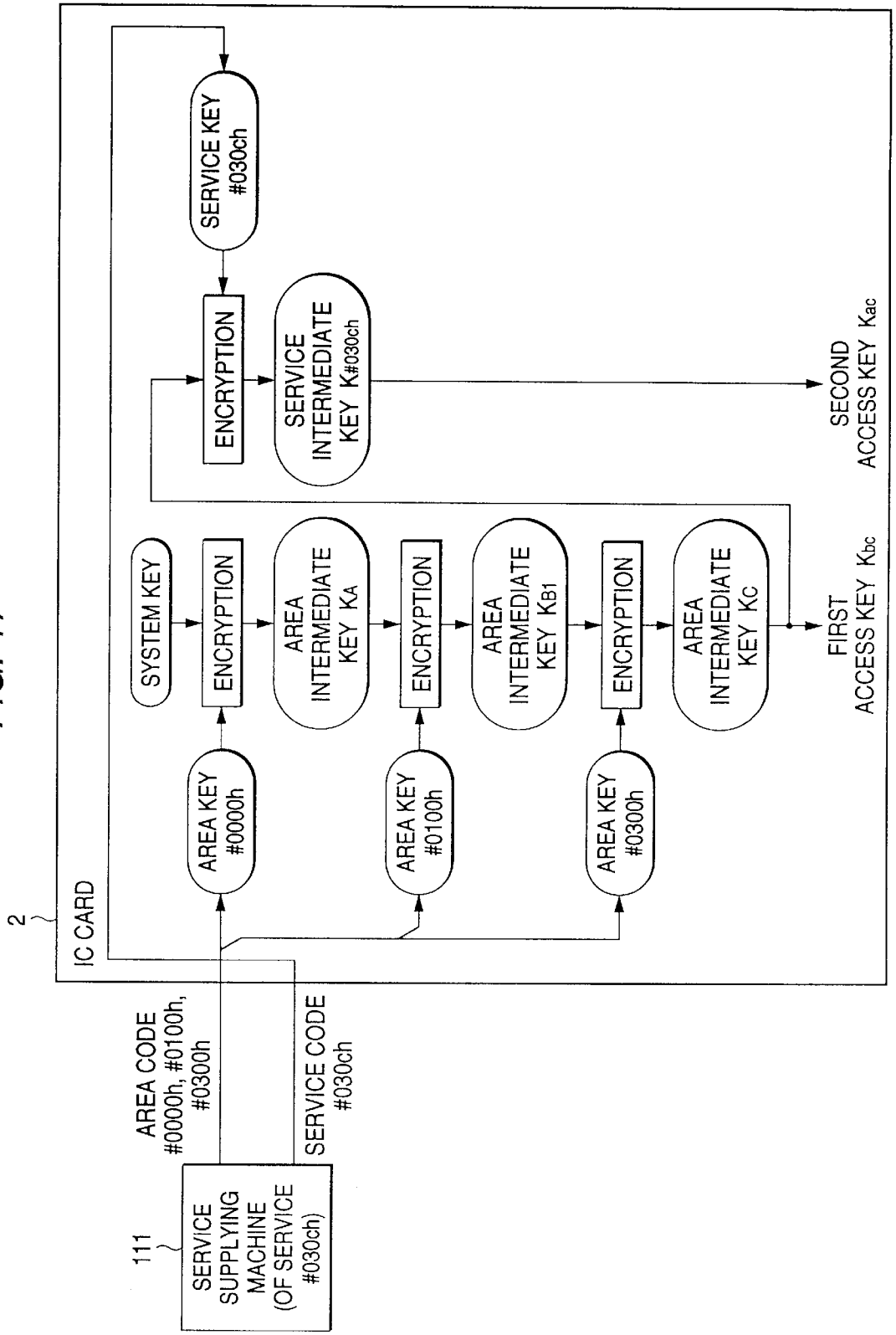
FIG. 17 is a diagram showing the processing of the IC card 2 when the manager C supplies services.

That is, as shown in FIG. 17, the registered area codes #0000h, #0100h and #0300h and the service code #030Ch are transmitted to the IC card 2. In the IC card 2 (sequencer 91), the area codes #0000h, #0100h and #0300h and the service code #030Ch are received from the service supply machine 111.

In the IC card 2, the system key stored in the system defining block (FIG. 4) is read out, and also the area key #0000h, #0100h or #0300h is read out from the area defining area having the area code #0000h, #0100h or #0300h which is received from the service supply device 111. Further, the system key is encrypted on the basis of the area key #0000h, so that the same key as the area intermediate key $K_A$ is generated. The same key as the area intermediate key $K_A$ is encrypted on the basis of the area key #0100h, so that the same key as the area intermediate key $K_{B1}$ is generated. The same key as the area intermediate key $K_{B1}$ is encrypted on the basis of the area key #0300h, so that the same key as the area intermediate key $K_C$ registered in the service supply machine 111 of FIG. 16 is generated. The same key as the area intermediate key $K_C$ is set as a first access key $K_{bc}$ used for certification.

In the IC card 2, the service key #030Ch is read out from the service defining area having the service code #030Ch received from the service supply machine 111. The area intermediate key $K_C$ is encrypted on the basis of the service key #030Ch, thereby generating the same key as the service intermediate key $K_{\#030Ch}$ registered in the service supply machine 111 of FIG. 16. The same key as the service intermediate key $K_{\#030Ch}$ is set as a second access key $K_{ac}$ used for certification.

Accordingly, in the above case, the area intermediate key $K_C$ or the service intermediate key $K_{030Ch}$ which is the first access key $K_{bc}$ or the second access key $K_{ac}$ is registered in the service supply machine 111, and the area intermediate key $K_c$ or the service intermediate key $K_{\#030Ch}$ which is the first access key $K_{bc}$ or the second access key $K_{ac}$ is generated in the IC card 2.

The mutual certification is carried out between the IC card 2 and the service supply machine 111 as in the case of FIGS. 12 and 13.

As a result of the mutual certification, if both the IC card 2 and the service supply machine 111 are recognized as being proper, an access to only the service area managed by the service defining area having the service code transmitted from the service supply machine 111 is permitted in the IC card 2. Accordingly, in the case of FIGS. 16 and 17, the access to only the service area managed by the service defining area #030Ch is possible.

That is, the manager C which knows the area intermediate key $K_C$, the area codes #0000h, #0100h, #0300h, the service key #030Ch and the service code #030Ch can access the service area managed by the service defining area #030Ch. However, the manager C knows neither the service key #0008h nor the service key #1022Ch, and basically, it cannot access the service area managed by the service defining area #0008h or #1022Ch.

As described above, the manager can access the service area thereof even when it does not know the area key of the upper layer.

As described above, each manager cannot access any service area managed by a service defining area for which the manager does not the service key. However, for example, there is a case where the manager C wishes to perform not only services using the service area managed by the service defining area #030Ch thereof, but also services using the service area managed by the service defining area #1022h of the manager B.

In this case, in order for the manager C to access the service area managed by the service defining area #1022h, it is necessary for the manager C to know the area intermediate key $K_{B2}$ the area codes #0000h, #1000h, the service key #1022h and the service code #1022h as described with reference to FIGS. 14 and 15. Accordingly, it is necessary to gain these information from the manger B2.

However, the service key #1022h known by the manager B2 is not known by even the manager A serving as the parent of the manager B2, and thus it is unfavorable from the viewpoint of security that the service key #1022h which is allowed to be known by only the manager B2 is informed to the manager C.

In this case, even when the security problem is neglected, in order for the manager C to access both the two service areas managed by the service defining area #030Ch or #1022h respectively, it is necessary to carry out the processing shown in FIG. 15 in the IC card 2 to generate the first access key $K_{bc}$ and the second access key $K_{ac}$ and perform mutual certification for an access to the service area managed by the service defining area #030Ch, and also carry out the processing shown in FIG. 17 to generate the first access key $K_{bc}$ and the second access key $K_{ac}$ and perform mutual certification for an access to the service area managed by the service defining area #1022h.

Accordingly, when the mutual certification for an access to a service area is carried out every service area, it is difficult to access the service area quickly. As a result, when the card system of FIG. 1 is applied to the examination of tickets in a station, it is difficult to access a predetermined service area of the IC card 2 and write or read data during a relatively short period in which a commuter passes through a gate provided at a ticket barrier.

Figure 18:
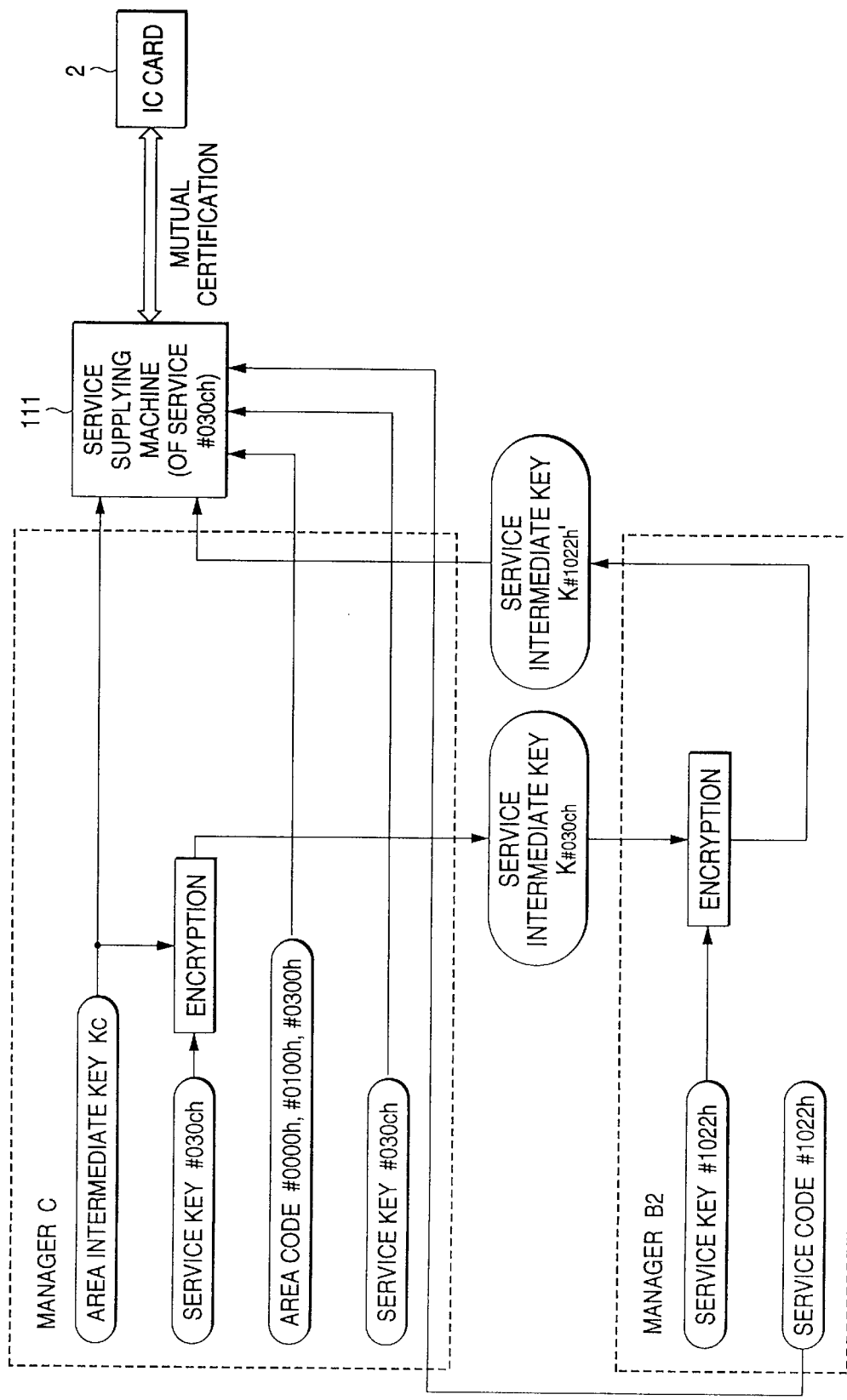
FIG. 18 is a diagram showing information necessary when the manager C supplies services.

Therefore, in a case where the manager C supplies not only services using the service area managed by the service defining area #030Ch thereof, but also services using the service area managed by the service defining area #1022h of the manager B2, in order to solve the security problem and ensure a quick access to the service area, information delivery as shown in FIG. 18 is carried out between the managers C and B2 and registered into the service supply machine 111.

That is, the manager C encrypts the service key #030Ch stored in the service defining area #030Ch on the basis of the area intermediate key $K_C$ as in the case of FIG. 16 to generate the service intermediate key $K_{\#030Ch}$. Further, the manager C delivers the service intermediate key $K_{\#030Ch}$ to the manager B2 to encrypt it on the basis of the service key #1022h. The manager C receives the service intermediate key $K_{\#1022h}$, which is an encryption result of the service intermediate key $K_{\#030Ch}$ on the basis of the service key #1022h, together with the service code #1022h.

Accordingly, only the service intermediate keys $K_{\#030Ch}$ and $K_{\#1022h}$ are delivered between the managers C and B2, and there is neither a case where the service key #030Ch which is known by only the manager C is known by the manager B2, nor a case where the service key #1022h which is known by only the manager B2 is known by the manager C. That is, there is no problem in security.

The manager C which receives the service intermediate key $K_{\#1022h}$, and the service code #1022h from the manager B2 registers into the service supply machine 111 the area codes of the area defining areas in upper layers above the layer of the area defining area #0300h thereof, that is, in this case, the area code #0000h of the area defining area #0000h of the manager A, the area code 0100h of the area defining area #0100h of the manager B1 and the area code #0300h of the area defining area #0300h of the manager C. Further, the manager C registers into the service supply machine 111 the area intermediate key $k_C$ and the service code #030Ch of the service defining area #0300h formed in the layer of the area defining area #0300h.

In this case, when the service supply machine 111 is inserted into the IC card 2, the following mutual certification is carried out between the service supply machine 111 and the IC card 2.

Figure 19:
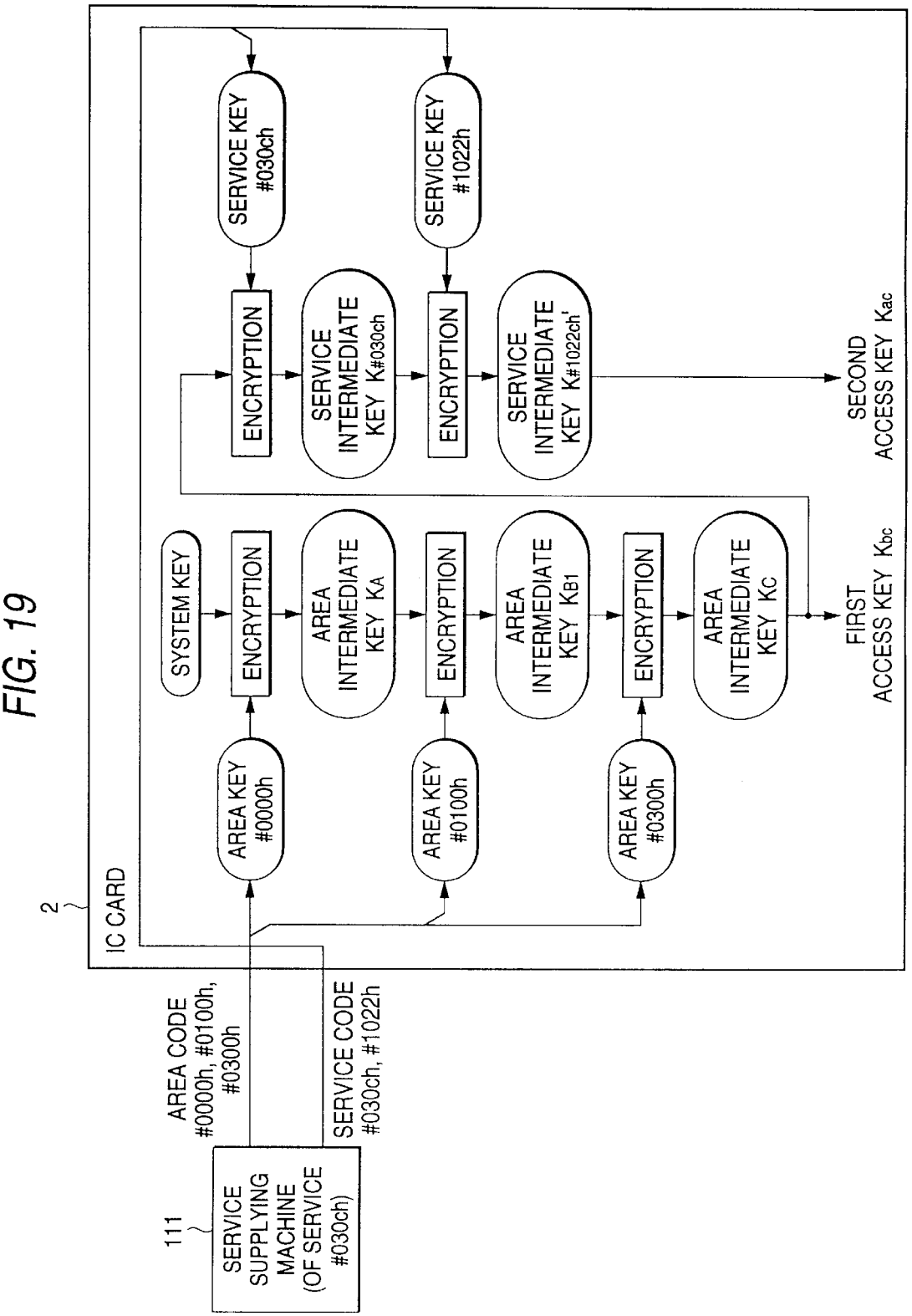
FIG. 19 is a diagram showing the processing of the IC card 2 when the manager C supplies services.

That is, as shown in FIG. 19, the service supply machine 111 transmits to the IC card 2 the registered area codes #0000h, #0100h and #0300h and the service codes #030Ch and #1022h. In the IC card 2 (sequencer 91), the area codes #0000h, #0100h and #0300h and the service codes #030Ch and #1022h are received from the service supply machine 111.

In the IC card 2, the system key stored in the system defining block (FIG. 4) is read out, and the area key #0000h, #0100h or #0300h is read out from the area defining area having the area code #0000h, #0100h or #0300h which is received from the service supply device 111, and the same key as the area intermediate key $K_C$ registered in the service supply machine 111 of FIG. 18 is generated as in the case of FIG. 17. The same key as the area intermediate key $K_C$ is set as a first access key $K_{bc}$ used for certification.

In the IC card 2, the service key #030Ch or #1022h is read out from the service defining area having the service code #030Ch or #1022h respectively which is received from the service supply machine 111. The area intermediate key $K_C$ is encrypted on the basis of the service key #030Ch and as a result the same key as the service intermediate key $K_{\#030Ch}$ is generated. Further, the same key as the service intermediate key $K_{\#030Ch}$ is encrypted on the basis of the service key #1022h, and the same key as the service intermediate key $K_{\#1022h}$, registered in the service supply machine 111 of FIG. 18 is generated. The same key as the service intermediate key $K_{\#1022h}$, is set as a second access key $K_{ac}$ used for certification.

Accordingly, in the above case, the area intermediate key $K_C$ or the service intermediate key $K_{\#1022h}$, which is the first access key $K_{bc}$ or the second access key $K_{ac}$ is registered in the service supply machine 111, and the area intermediate key $K_c$ or the service intermediate key $K_{\#1022h}$, which is the first access key $K_{bc}$ or the second access key $K_{ac}$ is generated in the IC card 2.

The mutual certification is carried out between the IC card 2 and the service supply machine 111 as in the case of FIGS. 12 and 13.

As a result of the mutual certification, if both the IC card 2 and the service supply machine 111 are judged to be proper, an access to only the service area managed by the service defining area having the service code transmitted from the service supply machine 111 is permitted in the IC card 2. Accordingly, in the case of FIGS. 18 and 19, the access to the service area managed by the service defining area #030Ch and the service area managed by the service defining area #1022Ch is permitted.

As described above, by encrypting the system key on the basis of the two or more area keys or service keys, the two or more area keys or service keys are degenerated (composed) into the two keys of the first access key $K_{bc}$ and the second access key $K_{ac}$, and the mutual certification to permit the access to the service area managed by the service defining area having the service code transmitted from the service supply machine 111 is performed by using the first access key $K_{bc}$ and the second access key $K_{ac}$. Therefore, even when the access to plural service defining areas is targeted, the mutual certification can be completed in a short time, thereby ensuring the quick access to the service area.

In the case of FIGS. 12 and 13, the mutual certification processing is performed by using the two keys of the first access key $K_{bc}$ and the second access key $K_{ac}$, however, it is possible to perform the mutual certification processing by using only the second access key $K_{ac}$, for example. In this case, in the IC card 2 the two or more area keys or service keys are degenerated into one second access key $K_{ac}$ by encrypting the system key on the basis of two or more area keys or service keys.

Figure 20:
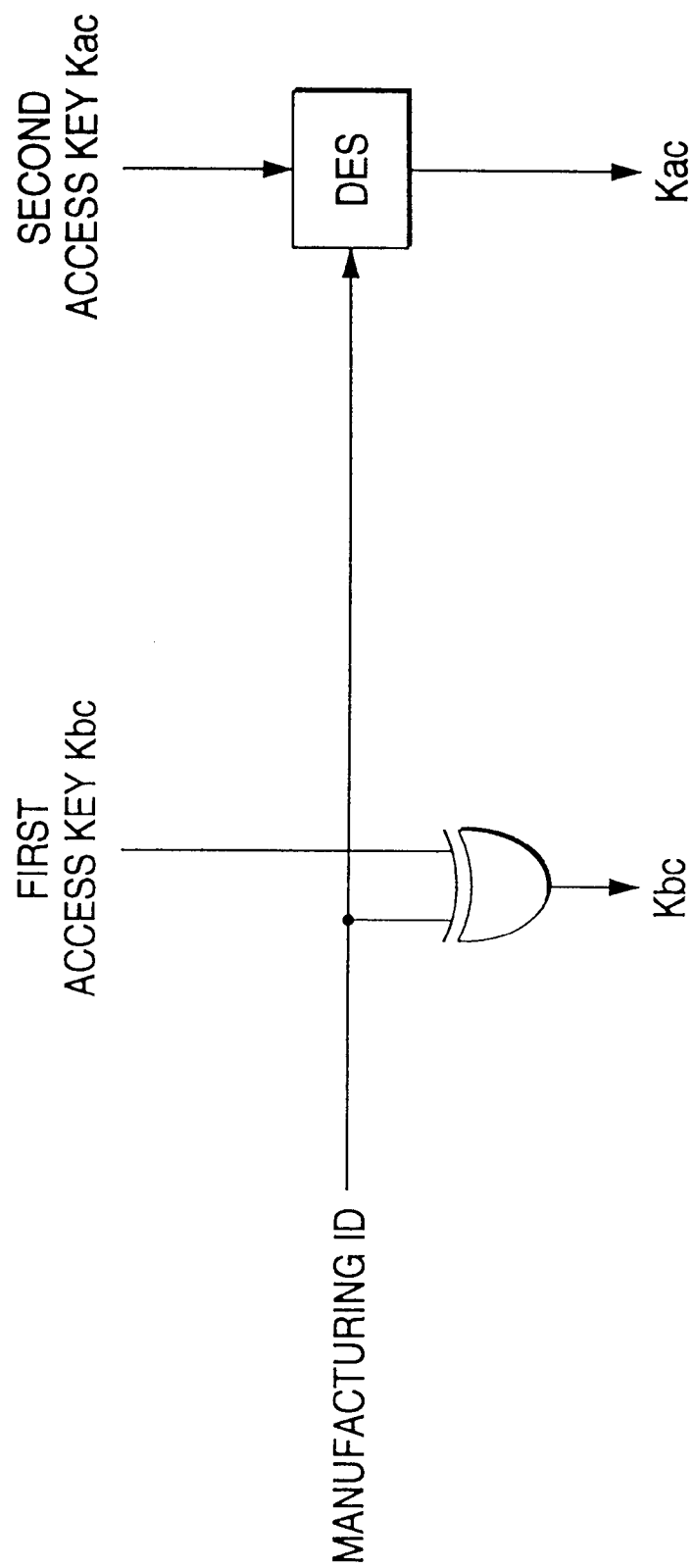
FIG. 20 is a diagram showing a method of generating a first access key and a second access key used for mutual certification.

Further, as shown in FIG. 20, it is possible to use an encryption result obtained by encrypting the first access key $K_{bc}$ and the second access key $K_{ac}$, for example, on the basis of a manufacturing ID which is stored in the manufacturing ID block and is an inherent value to the IC card 2. Here, in FIG. 20, with respect to the first access key $K_{bc}$, the encryption is carried out by subjecting the first access key $K_{bc}$ and the manufacturing ID to EXOR. With respect to the second access key $K_{ac}$, the encryption based on DES system is performed. With respect to the second access key $K_{ac}$, the encryption based on the DES system may be performed by using the EXOR result of the first access key $K_{bc}$ and the manufacturing ID as a key.

As described above, when the encryption result obtained by encrypting the first access key $K_{bc}$ and the second access key $K_{ac}$ is used for the mutual certification, the security can be more enhanced. In this case, the manufacturing ID is needed in the service supply machine 111, and it may be transmitted from the IC card 2.

Next, the storage area of EEPROM 66 has a layered structure in which the area defining are is layered, and each area defining area and each service defining area are designed to store an area key and a service key for certification. As a result, the following access control having flexibility can be performed.

That is, when a manager serves as a parent manager and wishes to stop a service supply by a child manager to which a resource of the parent manager is shared because the child manager makes an unjust service, the parent manager can prohibit the child manager from accessing the IC card 2 by altering the area key stored in the area defining area.

Specifically, for example when the manager B1 stops the service supply of the manager C in FIG. 5, the manager B1 alters the area key #0100h stored in the area defining area #0100h of the IC card 2. In this case, the area intermediate key $K_{B1}$ formed in the IC card 2, and further the area intermediate key $K_C$ are also altered in FIG. 17, so that the manager C which knows only the area intermediate key $K_C$ before the alteration cannot access the service defining area #030Ch.

The manager A which is the parent manager of the manager B1 serving as the parent manager of the manager C may alter the area key #0000h stored in the area defining area #0000h to prohibit the access to the service defining area #030Ch. However, in this case, the manager B2 which is a child of the manager A cannot access the service area managed by the service defining area #1022h of the manager B2. That is, when a manager alters the area key thereof, it is impossible to access service defining areas managed by area defining areas in layers (child layer, grandchild layer, . . . ) of the area defining area corresponding to the area key.

In FIGS. 18 and 19, the manager C uses (the service area managed by) the service defining area #1022h of the manager B2 commonly to the manager B2. However, more complicated common use of the service defining area is possible between managers for some types of key management.

Figure 21:
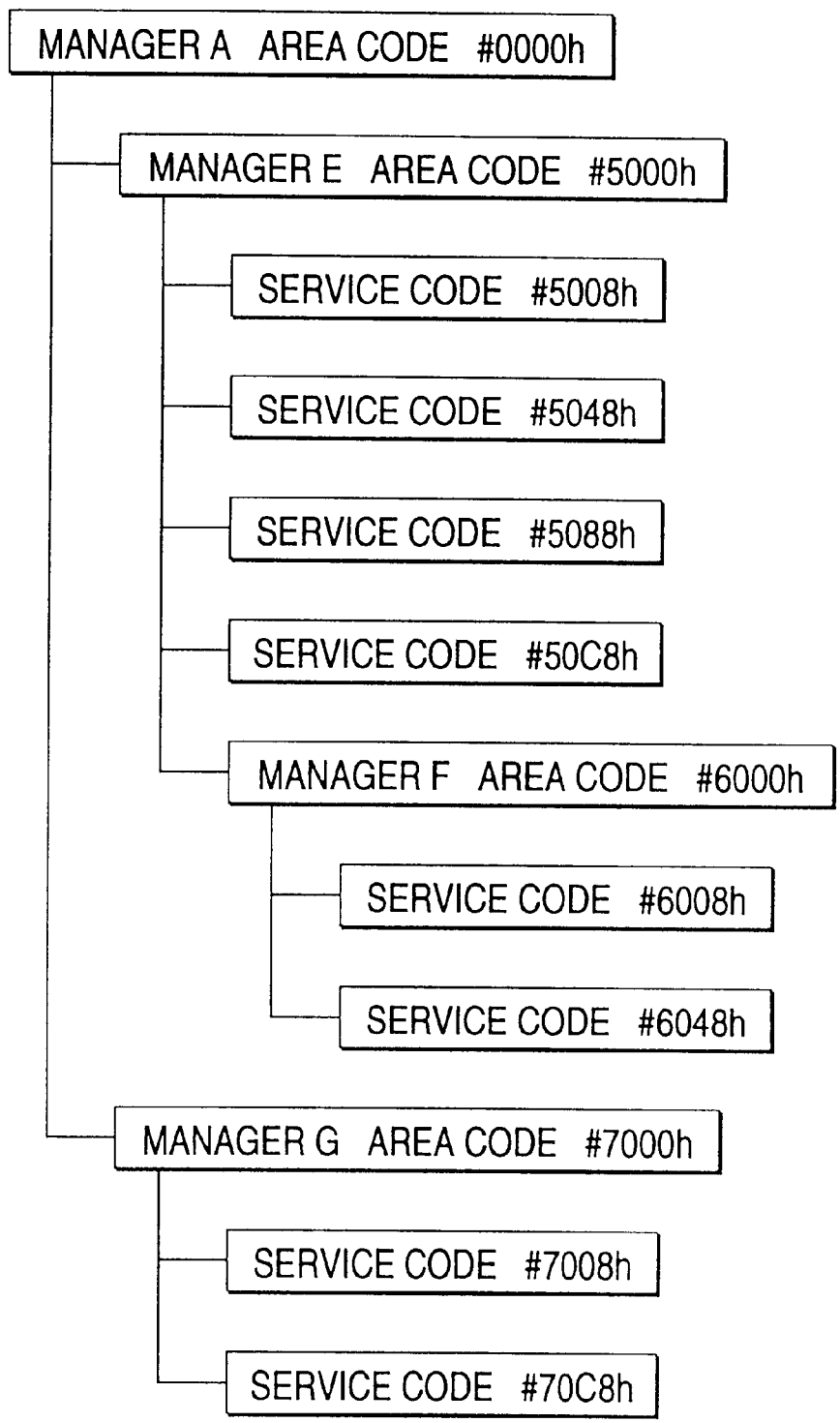
FIG. 21 is a diagram showing the layer structure of EEPROM 66.

Specifically, for example, it is assumed that a layer structure shown in FIG. 21 is constructed in EEPROM 66. That is, in FIG. 21, an area defining area #5000h of a manager E and an area defining area #7000h of a manager G are formed as child layers of the layer of the area defining area #0000h of the manager A serving as an issuer of the IC card 2. Further, service defining areas #5008h, #5048h, #5088h and #50C8h are formed in the layer of the area defining area #5000h of the manager E, and an area defining area #6000h of a manager F is formed.

Further, service defining areas #6008h and #6048h are formed in the layer of the area defining area #6000h of the manager F, and service defining areas #7008h and #70C8h are formed in the layer of the area defining area #7000h of the manager G.

Figure 22:
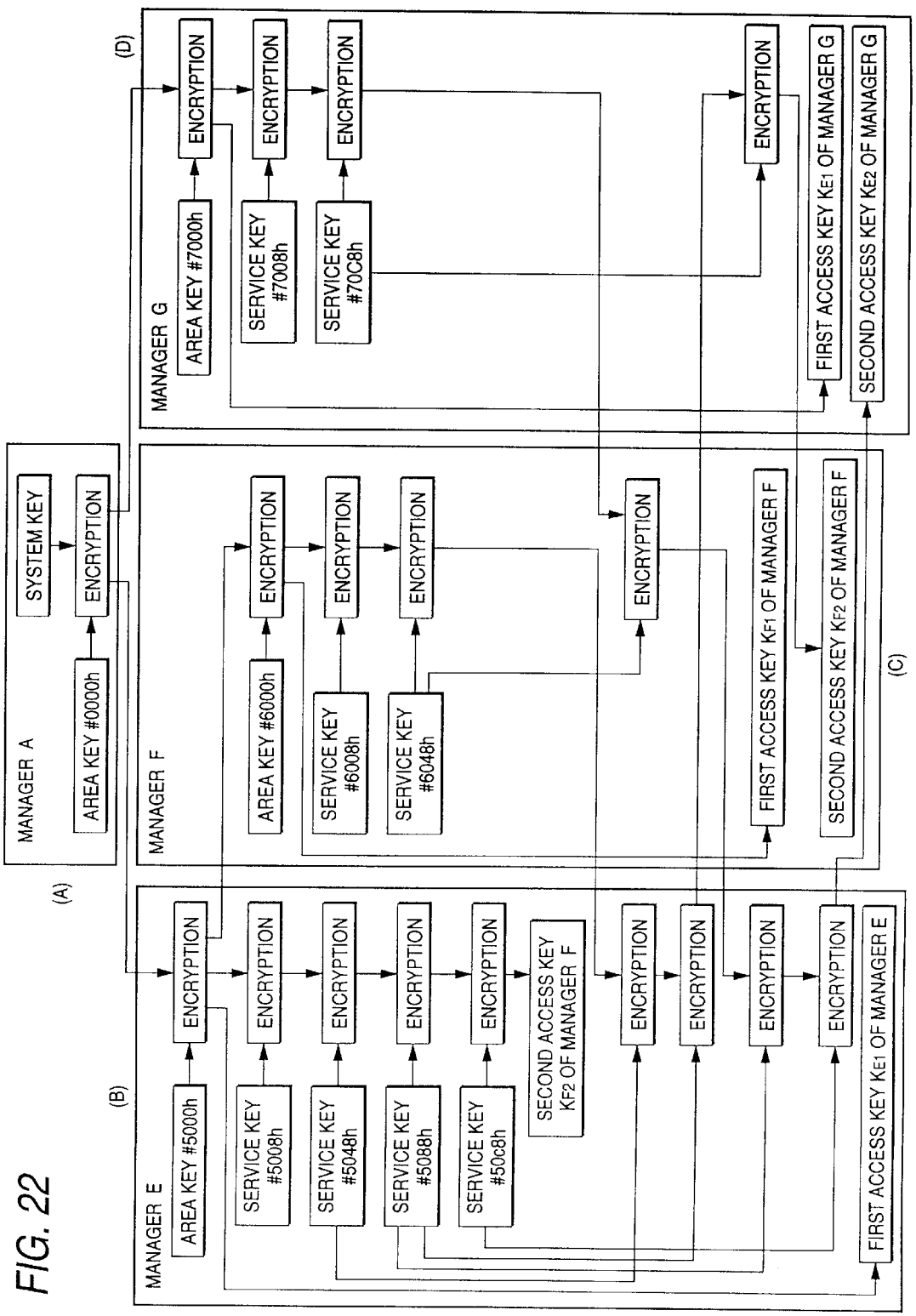
FIG. 22 is a diagram showing key reception/delivery between managers.

In the above-mentioned layer structure, the manager A encrypts the system key on the basis of the area key #0000h as shown in (A) of FIG. 22, and delivers the encryption result to the managers E and G serving as the child managers.

As shown in (B) of FIG. 22, the manager E encrypts, on the basis of the area key #5000h, the encryption result of the system key on the basis of the area key #0000h from the manager A, and uses the encryption result as a first access key $K_{E1}$. Further, the manager E encrypts the first access key $K_{E1}$ (the encryption result based on the area key #5000h) successively on the basis of each of the service keys #5008h, #5048h, #5088h and #50C8h, and uses the final encryption result as a second access key $K_{E2}$.

As shown in (C) of FIG. 22, the manager F is supplied with the first access key $K_{E1}$ (the encryption result based on the area key #5000h) from the manager E, encrypts it on the basis of the area key #6000h, and sets the encryption result as a first access key $K_{F1}$. Further, the manager F encrypts the first access key $K_{F1}$ (the encryption result based on the area key #6000h) successively on the basis of each of the service keys #6008h and #6048h, and delivers the encryption result to the manager E to encrypt it successively on the basis of each of the service keys #5048h and #5088h. Thereafter, the manager F is supplied with the encryption result from the manager E and delivers it to the manager G to encrypt it on the basis of the service key #70C8h. The manager F is supplied with the encryption result from the manager G, and uses it as a second access key $K_{F2}$.

As show in (D) of FIG. 22, the manager G encrypts the encryption result of the system key based on the area key #0000h from the manager A on the basis of the area key #7000h, and uses the encryption result as a first access key $K_{G1}$. Further, the manager G encrypts the first access key $K_{G1}$ (the encryption result based on the are key #7000h) successively on the basis of each of the service keys #7008h and #70C8h, and delivers the final encryption result to the manager F to encrypt it on the basis of the service key #6048h. Thereafter, the manager G delivers to the manager E the encryption result using the service key #6048 by the manager F to encrypt the encryption result successively on the basis of each of the service keys #5088h and #50C8h. The manager G is supplied with the encryption result from the manager E and uses it as a second access key $K_{G2}$.

Figure 23:
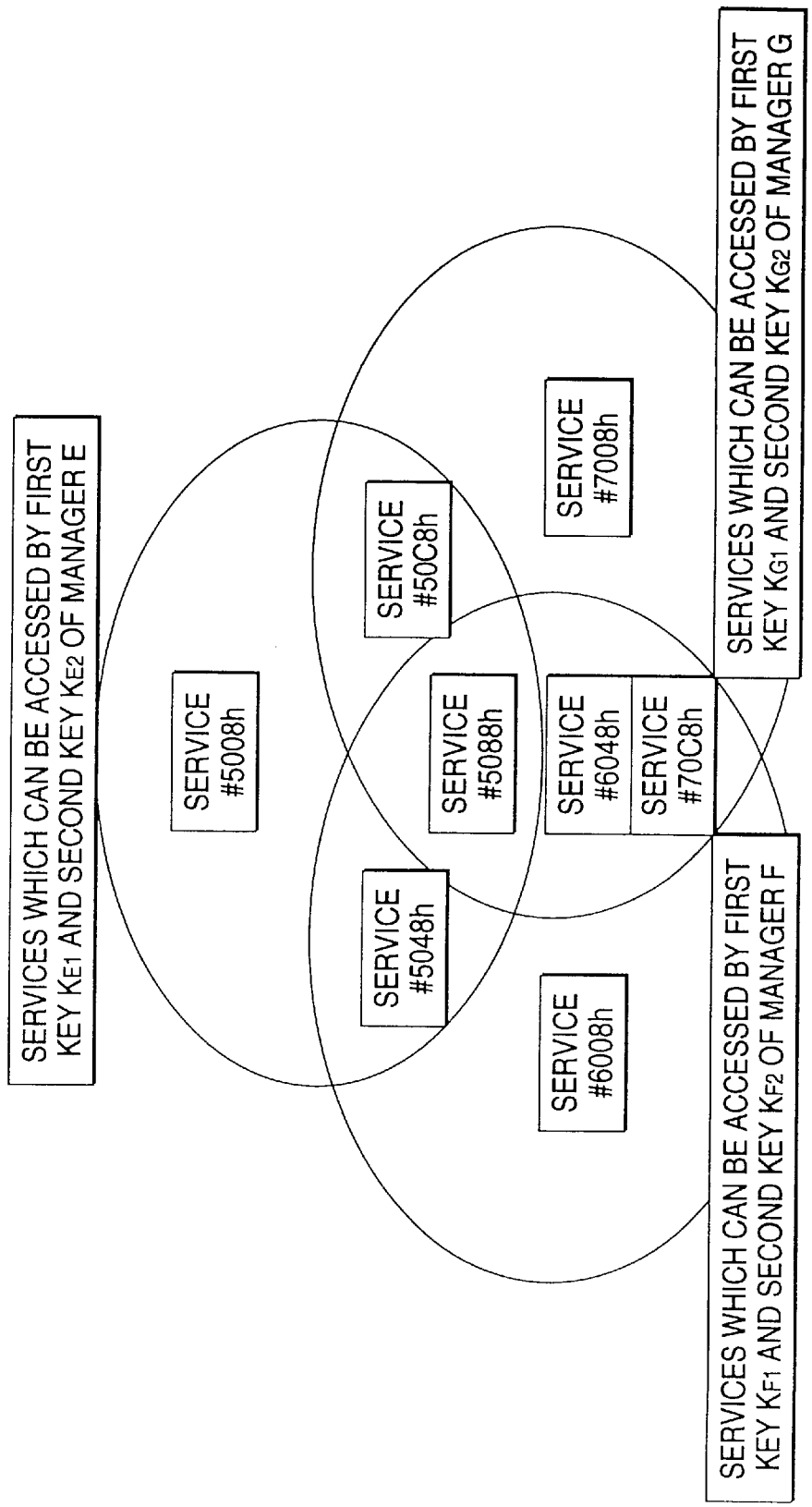
FIG. 23 is a diagram showing common use of services (data) between managers.

In this case, in the IC card 2, the system key is encrypted by using the area key and the service key stored in EEPROM 66 according to the same procedure as the case of FIG. 22 to generate the first access key and the second access key, whereby the common use of the service defining area as shown in FIG. 23 can be mutually performed among the managers E, F and G.

That is, the manager E can access only the service defining areas #5008, #5048h, #5088h and #50C8h thereof.

The manager F can access not only the service defining areas #6008h and #6048h thereof, but also the service defining areas #5048h and #5088h of the manager E and the service defining area #70C8h of the manager G. The manager G can access not only the service defining areas #7008h and #70C8h thereof, but also the service defining areas #5088h and #50C8h of the manager E and the service defining area #6048h of the manager F.

In the key delivery as shown in FIG. 22, there is no case where the service key itself of a manager is known by another manager. That is, the service keys #50008h, #5048h, #5088h, #50C8h of the manager E are never known not only by the manager A by the managers F and G. Likewise, the service keys #6008h and #6048 of the manager F are never known by the managers E and G, and the service keys #7008h and #70C8h of the manager G are never known by the managers E and F.

Further, as described above, when some manager alters its area key, it is impossible to access to all the service defining areas managed by the area defining area of the layer in the layer of the area defining area, that is, when the parent manager alters the area key, the child manager cannot access the IC card 2. However, in accordance with a specific key management method, an access of a specific child manager can be prohibited.

Figure 24:
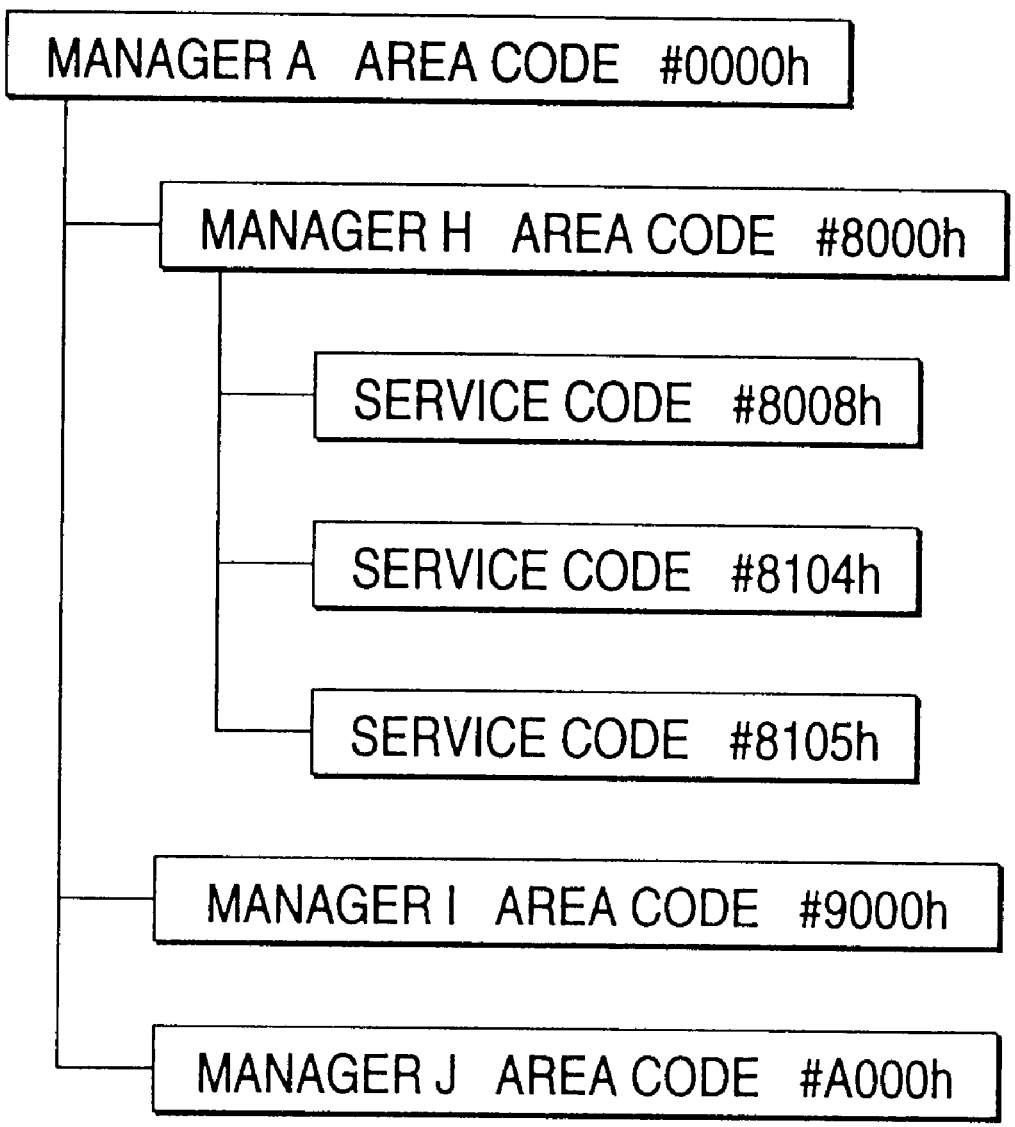
FIG. 24 is a diagram showing the layer structure of EEPROM 66.

Specifically, for example, it is assumed that a layer structure as shown in FIG. 24 is constructed in EEPROM 66. That is, in FIG. 24, an area defining area #8000h of a manager H, an area defining area #9000h of a manager I and an area defining area #A000h of a manager J are formed as child layers of the layer of the area defining area #0000h of the manager A serving as the issuer of the IC card 2. Further, service defining areas #8008h, #8104h and #8105h are formed in the layer of the area defining area #8000h of the manager H.

In the above layer structure, as shown in (A) of FIG. 25, the manager A encrypts the system key on the basis of the area key #0000h and delivers the encryption result to the managers I and J serving as child managers thereof.

As shown in (C) of FIG. 25, the manager I encrypts the encryption result of the system key based on the area key #0000h from the manager A on the basis of the area key #9000h, and use the encryption result as a first access key $K_{I1}$. Further, the manager I delivers the first access key $K_{I1}$ (the encryption result based on the area key #9000h) to the manager H to encrypt it successively on the basis of each of the service keys #8008h and #8104h as shown in FIG. 25(B). Then, the manager I uses the encryption result as a second access key $K_{I2}$ as shown in FIG. 25(C).

As shown in (D) of FIG. 25, the manager J encrypts the encryption result of the system key based on the area key #0000h from the manager A on the basis of the area key #A000h, and uses the encryption result as a first access key $K_{J1}$. Further, the manager J delivers the first access key $K_{J1}$ (the encryption result based on the area key #A000h) to the manager H to encrypt the encryption result successively on the basis of each of the service keys #8008h and #8105h as shown in (B) of FIG. 25. The manager J uses the encryption result as a second access key $K_{J2}$ as shown in (D) of FIG. 25.

In this case, in the IC card 2, the system key is encrypted by using the area key and the service key stored in EEPROM 66 according to the same procedure as the case of FIG. 25 to generate the first access key and the second access key, whereby the manager I can access the service defining areas #8008h and #8104h of the manager H and the manager J can access the service defining areas #8008h and #8105h of the manager H.

The manager H forms the service defining area #8008h so as to commonly use the data thereof between the managers I and J, and forms the service defining area #8104h or #8105h as a so-called dummy service defining area to control the access to the service defining area #8008h by each of the manager I or J. Accordingly, the service areas managed by the service defining areas #8104h and #8105H are not necessary, and the capacity thereof may be equal to zero.

In this case, for example when the manager H alters the service key #8104h, the manager I in which the second access key $K_{I2}$ is generated by using the service key #8104h to perform the certification processing in the IC card 2 cannot access the service defining area #8008h. That is, only the access to the service defining area #8008h by the manager I is prohibited. On the other hand, for example when the manager H alters the service key #8105h, the manager J in which the second access key $K_{J2}$ is generated by using the service key #8105h to perform the certification processing in the IC card 2 cannot access the service defining area #8008h. That is, only the access to the service defining area #8008h by the manager J is prohibited.

As described above, a specific child manager can be prohibited from accessing by using a dummy service defining area.

In the foregoing description, the present invention is applied to a non-contact card system in which the communication is performed under a contactless state. However, the present invention may be applied to a card system in which the communication is performed under a contact state. Further, the application range of the present invention is not limited to the card system.

In this embodiment, the certification is carried out by a so-called secrete key system, however, it may be performed by a so-called open-public key system.

In this embodiment, when the service defining area of the layer of an area defining area is accessed, the first access key is generated by successively using the area keys of the area defining areas on the bus from the layer of the area defining area to the uppermost layer, however, the generation method of the first access key is not limited to the above manner. Further, according to this embodiment, the second access key is generated by successively using the service keys of the service defining area to be accessed. However, the generation method of the second access key is not limited to the above manner. That is, the first access key and the second access key can be generated by successively using any two or more area keys or service keys.

Further, in this embodiment, each of the user block and the system block is stored in EEPROM 66 which is one memory. However, the user block and the system block may be stored in physically different memories.

In this embodiment, data are stored in EEPROM, however, the data may be stored in a semiconductor memory, a magnetic disc or the like other than EEPROM.

According to the data storage data and the data storage method of the present invention, the storage means is managed on the basis of the storage content of the area defining area of the storage means having the area defining area for storing the range of the storage area identifying code which can be allocated to the storage area to be managed and is used to identify the storage area, and for storing the empty capacity of the storage area to be managed. Accordingly, the resource management of the storage means can be performed.

According to the data storage device and the data storage method of the present invention, the storage area of the data storage means is managed while it is designed in a layer structure, and one or more certification keys used for certification are generated by using two or more layer keys to each layer of the storage area of the data storage means or data storage area keys to the storage area in which data are stored, and the certification is carried out on the basis of the certification key. Accordingly, the access control having flexibility and high security can be performed on the data storage means.

What is claimed is:

1. A data storage device for storing data to supply a predetermined service, characterized by comprising:

data storage means for storing the data in a storage area;

management means for managing the storage area in a layered structure;

layer key storage means for storing layer keys, each of the layer keys corresponding to a respective layer of the storage area;

area key storage means for storing an area key for the storage area in which the data are stored;

generating means for generating a certification key for certification to access the storage area by using at least two layer keys corresponding to hierarchically related layers and the area key; and certification means for certificating the storage area on the basis of the generated certification key.

2. The data storage device as claimed in claim 1, wherein said certification means performs encryption or decoding on the basis of the certification key.

3. The data storage device as claimed in claim 1, wherein said generating means encrypts predetermined information on the basis of the layer key for a predetermined layer.

4. The data storage device as claimed in claim 3, wherein the predetermined information is encrypted on the basis of the layer key for the parent layer of the predetermined layer.

5. The data storage device as claimed in claim 1, wherein the generating means encrypts predetermined information by successively using layer keys for layers on a bus until a predetermined layer, and encrypts the encryption result by using the area key, thereby generating the certification key.

6. The data storage device as claimed in claim 1, further including communication means for performing communications with external equipment, wherein said generating means recognizes two or more layer keys or area keys used to generate the certification key on the basis of information from said external equipment.

7. The data storage device as claimed in claim 1, wherein said generating means converts the certification key on the basis of information inherent to said device, and said certification means performs certification on the basis of the conversion result of the certification key based on the inherent information.

8. The data storage device as claimed in claim 1, wherein said storage means is non-volatile.

9. The data storage device as claimed in claim 1, further including communication means for performing communications with external equipment, and said certification means performs certification with said external equipment.

10. The data storage device as claimed in claim 9, wherein said communication means performs communications with said external equipment under a contact or non-contact state.

11. A data storage device for storing data to supply a predetermined service, said device comprising:

data storage means having an area/service defining area, and a service area for storing data corresponding to the predetermined service, said area/service defining area storing a) the range of a storage area defining code which can be allocated to a storage area to be managed and used to identify the storage area, b) an empty capacity of the storage area to be managed, and c) a predetermined key for certification; and management means for managing the storage area of said storage means on the basis of the storage content of the area/service defining area while designing the storage area in a layer structure in which the area/service defining area is set as a layer, wherein the management means performs said certification by using the predetermined key.

12. The data storage device as claimed in claim 11, wherein said management means sets a predetermined area/service defining area as a parent layer and forms an area/service defining area of a child layer of the parent layer and manages the area/service defining area while setting the area/service defining area in a layer structure.

13. The data storage device as claimed in claim 12, wherein said management means forms the area/service defining area of the child layer when the range of the storage area defining code in the area/service defining area of the child layer is within the range of the storage area defining code of the area/service defining area of the parent layer.

14. The data storage device as claimed in claim 11, wherein said management means forms the area/service defining area of the child layer when the capacity of the storage area allocated to the area/service defining area of the child layer is within the range of the empty capacity of the area/service defining area of the parent layer.

15. The data storage device as claimed in claim 11, wherein said storage means further includes a service area which stores a service area defining code to identify the service area and manages the service area.

16. The data storage device as claimed in claim 15, wherein said management means sets a predetermined defining area as a layer, and forms the service defining area to which the layer belongs.

17. The data storage device as claimed in claim 16, wherein said management means forms the service defining area when the service area defining code in the service defining area is within the range of the storage area defining code of the area/service defining area.

18. The data storage device as claimed in claim 15, wherein the service defining area also stores the capacity of the service area.

19. The data storage device as claimed in claim 18, wherein said management means forms the service area when the capacity of the storage area allocated to the service defining area is within the range of the empty capacity in the area/service defining area.

20. The data storage method as claimed in claim 11, wherein said storage means further includes a service area storing the data corresponding to the predetermined service, and a service defining area storing a service area defining code to identify the service area, and the service defining area belongs to the area/service defining area of some layer.

21. The data storage device as claimed in claim 15, wherein the service defining area also stores a predetermined key, and said management means also performs certification by using the key.

22. The data storage device as claimed in claim 21, wherein said management means performs certification by encryption or decoding on the basis of the keys stored in the two or more area/service defining areas or service defining areas.

23. The data storage device as claimed in claim 21, wherein said management means degenerates keys stored in the two or more area/service defining areas or service defining areas into one or more keys to thereby generate a degenerated key, and the certification is performed by using the one or more degenerated keys.

24. The data storage device as claimed in claim 11, wherein said management means manages the area/service defining area on the basis of the range of the storage area defining code stored in the area/service defining area while setting the area/service defining area in a layer structure.

25. The data storage device as claimed in claim 11, wherein said storing means is non-volatile.

26. The data storage device as claimed in claim 11, further including communication means for performing communications with external equipment, wherein said management means manages said storage means in response to an instruction from the external equipment.

27. The data storage device as claimed in claim 26, wherein said communication means performs the communications with the external equipment under a contact or non-contact state.

28. A data storage method for a data storage device for storing data to supply a predetermined service, characterized in that said data storage device includes: data storage means for storing data in a storage area, management means for managing the storage area in a layered structure, layer key storage means for storing layer keys, each of the layer keys corresponding to a respective layer of the storage areas, and area key storage means for storing an area key for the storage area in which the data are stored; said method comprising:

a generation step of generating a certification key used for certification to access the storage area by using at least two layer keys corresponding to hierarchically related layers and the area key; and a certification step for certificating the storage area on the basis of the generated certification key.

29. The data storage device as claimed in claim 28, wherein said certification step performs encryption or decoding on the basis of the certification key.

30. The data storage method as claimed in claim 28, wherein said generation step generates the certification key by encrypting predetermined information on the basis of the layer key for a predetermined layer.

31. The data storage method as claimed in claim 30, wherein the predetermined information is encrypted on the basis of the layer key for the parent layer of the predetermined layer.

32. The data storage method as claimed in claim 28, wherein said generation step encrypts predetermined information by successively using the layer keys for layers on a bus until a predetermined layer, and encrypts the encryption result by using the data storage key, thereby generating the certification key.

33. The data storage method as claimed in claim 28, wherein said data storage device further includes communication means for performing communications with external equipment, and said generating step recognizes two or more layer keys or area keys used to generate the certification key on the basis of the information from the external equipment.

34. The data storage method as claimed in claim 28, wherein said generation step converts the certification key on the basis of information inherent to said device, and said certification step performs the certification on the basis of the conversion result of the certification key based on the information inherent to said device.

35. The data storage method as claimed in claim 28, wherein said storage means is non-volatile.

36. The data storage method as claimed in claim 28, wherein said data storage device further includes communication means for performing communications with external equipment, and said certification step performs certification with the external equipment.

37. The data storage device as claimed in claim 36, wherein said communication means performs the communications with the external equipment under a contact or non-contact state.

38. A data storage method for a data storage device for storing data to supply a predetermined service, characterized in that said data storage device includes data storage means having an area/service defining area for storing: a) the range of a storage area defining code which can be allocated to a storage area to be managed and used to identify the storage area, b) an empty capacity of the storage area to be managed, and c) a predetermined key for a certification; and said method comprises:

a management step of managing the data storage area of said storage means on the basis of the storage content of the area/service defining area while designing the storage area in a layer structure in which the area/service defining area is set as a layer; and a certification step of performing said certification using the predetermined key.

39. The data storage method as claimed in claim 38, wherein said management step sets a predetermined area/service defining area as a parent layer, forms an area/service defining area serving as a child layer of the parent layer and manages the area/service defining area while setting the area/service defining area in a layer structure.

40. The data storage method as claimed in claim 39, wherein said management step forms the area/service defining area of the child layer when the range of the storage area defining code in the area/service defining area of the child layer is within the range of the storage area defining code of the area/service defining area of the parent layer.

41. The data storage method as claimed in claim 38, wherein said management step forms the area/service defining area of the child layer when the capacity of the storage area allocated to the area/service defining area of the child layer is within the range of the empty capacity in the area/service defining area of the parent layer.

42. The data storage method as claimed in claim 38, wherein said storing means further includes a service defining area which stores a service area defining code to identify the service area and manages the service area.

43. The data storage method as claimed in claim 42, wherein said management step sets a predetermined area/service defining area as a layer, and forms the service defining area belonging to the layer.

44. The data storage method as claimed in claim 43, wherein said management step forms the service defining area when the service area defining code in the service defining area is within the range of the storage area defining code of the area/service defining area.

45. The data storage method as claimed in claim 43, wherein said management step forms the service area when the capacity of the storage area allocated to the service defining area is within the range of the empty capacity in the area/service defining area.

46. The data storage method as claimed in claim 42, wherein the service defining area also stores the capacity of the service area.

47. The data storage method as claimed in claim 38, wherein said storage means includes a service area for storing data corresponding to the predetermined service, a service defining area for storing a service area defining code to identify the service area, and the service defining area belongs to the area/service defining area of some layer.

48. The data storage method as claimed in claim 42, wherein the service defining area also stores a predetermined key, and said management means performs certification by using the key.

49. The data storage method as claimed in claim 48, wherein said management step performs certification by encryption or decoding on the basis of the keys stored in the two or more area/service defining areas or service defining areas.

50. The data storage method as claimed in claim 48, wherein said management step degenerates keys stored in the two or more area/service defining areas or service defining areas into one or more keys to generate a degenerated key, and performs the certification by using the one or more degenerated keys.

51. The data storage method as claimed in claim 38, wherein said management step manages the area/service defining area on the basis of the range of the storage area defining code stored in the area/service defining area while setting the area/service defining area in a layered structure.

52. The data storage method as claimed in claim 38, wherein said storage means is non-volatile.

53. The data storage method as claimed in claim 38, wherein said data storage device further includes communication means for performing communications with external equipment, and said management step manages said storage means in response to an instruction from the external equipment.

54. The data storage method as claimed in claim 53, wherein said communication means performs the communications with the external equipment under a contact or non-contact state.

55. The data storage device as claimed in claim 11, wherein:

the data storage means further includes a second area/service defining area storing a second predetermined key for certification, the second area/service defining area is set as a layer hierarchically below the first area/service defining area, and the management means performs said certification by using the two predetermined keys.

56. The data storage method as claimed in claim 38, wherein:

the data storage means further includes a second area/service defining area storing a second predetermined key for certification, the second area/service defining area is set as a layer hierarchically below the first area/service defining area, and the certification step includes performing said certification by using the two predetermined keys.

* * * * *